United States Patent [19]

Chamuel

[11] 4,035,762

[45] July 12, 1977

[54] POSITION SENSING READOUT

[75] Inventor: Jacques R. Chamuel, Allston, Mass.

[73] Assignee: The Charles Stark Draper Laboratory, Inc., Cambridge, Mass.

[21] Appl. No.: 520,742

[22] Filed: Nov. 4, 1974

[51] Int. Cl.² .......................................... G01S 3/80
[52] U.S. Cl. .................... 340/16 R; 73/67
[58] Field of Search ........................ 340/16 R, 1 C; 73/339 A, 67, DIG. 1; 74/5

[56] References Cited

U.S. PATENT DOCUMENTS

| 3,121,955 | 2/1964 | King | 340/16 P |
|---|---|---|---|
| 3,134,099 | 5/1964 | Woo | 340/16 R |
| 3,140,612 | 7/1964 | Houghton et al. | 73/71.2 |
| 3,156,766 | 11/1964 | Stamps | 340/16 R |
| 3,428,789 | 2/1969 | Richard | 340/16 R |
| 3,534,609 | 10/1970 | Grenfell et al. | 73/339 A |
| 3,717,033 | 2/1973 | Gordon et al. | 73/339 A |

FOREIGN PATENT DOCUMENTS 1,035,763  7/1966  United Kingdom ............ 73/339 A Primary Examiner—Maynard R. Wilbur
Assistant Examiner—T. M. Blum
Attorney, Agent, or Firm—Robert F. O'Connell

[57] ABSTRACT

Apparatus for determining linear or angular measurements or measurements of positions on a planar or curved surface, which apparatus uses at least one delay element, such as a magnetostrictive element, for example, which is capable of supporting an accoustic wave signal. The one or more delay elements may be in the form of bands, rods, wires, planar or spherical structures, and the like, and can be arranged in various embodiments to provide linear or angular position information for single, dual, and multiaxis geometry. They can be used, for example, to provide single or multispeed resolver operation and three-axis attitude read-out. In preferred embodiments the apparatus uses phase measurement techniques so that high accuracy can be achieved.

45 Claims, 23 Drawing Figures

POSITION SENSING READOUT

INTRODUCTION

This invention relates to apparatus for determining a position in linear, angular, and curvilinear configurations for single and multiaxis geometry and, more particularly, to apparatus using means, such as magnetostrictive components, which support travelling acoustic wave signals by which such angular and distance measurements can be appropriately determined.

BACKGROUND OF THE INVENTION

It is desirable to provide relatively simple means for measuring a position along a line, either straight or curved, or on a planar or other curvilinear surface, with a high degree of accuracy at a reasonable cost. One example of the use of such a measuring device is exemplified by presently known navigation apparatus which use attitude readout devices for determining the angular orientation of an object relative to a set of reference axes for use in inertial navigation systems, for example. In addition, it is often desirable to know the position of an object with respect to a reference point along a line or on planar or curved surfaces. Further, it may be desirable to determine the angular position of a rotating object with respect to a reference angle.

DESCRIPTION OF THE PRIOR ART

Various devices are presently known for measuring linear or angular displacements. For example, various types of resolver devices have been used in the past for measuring angular displacements (e.g., the angular displacements of a rotating shaft). One conventional exemplary type of resolver (sometimes referred to as a "synchro") generates signals phase modulated by a shaft angle. Such resolvers make use of the variable coupling between primary and secondary moving coil windings on a stator and a rotor, in a manner known to the art, in order to perform the angular measurement. Sine and cosine signal components of the angle to be measured are thereby produced and the angle is appropriately calculated as a measurement of $\tan^{-1}$ of the ratio thereof.

Means must be provided for coupling signals between the stator and rotor either to excite the rotor windings or to receive signals from the rotor windings. Slip rings or rotary transformers are often used. Usually the windings are constructed of wire and the complete assembly is likely to occupy quite a large volume. Construction techniques for minimizing volume are extremely complicated, and high accuracy is difficult to obtain when volume is restricted.

Another conventional resolver device, often called a "microsvn", also can provide phase-modulated signals and offers the advantage over synchros in that slip rings or rotary transformers are unnecessary. Driver and receiver windings are located on the stator only. The rotor consists of high-permeability material machined to form salient poles resembling gear teeth, and the angular measurement is effected through the variable coupling of magnetic fields from stator windings through the rotor structure and back to stator windings. Separate driver and receiver windings are used on the stator. Since the windings are constructed of wire, and since the magnetic path requires teeth protruding from the stator and from the rotor, microsyns are difficult to produce in small volumes. Miniature microsyns for inertial components are extremely expensive for this reason. Subsequently developed devices called the Inductosyn, made and sold by Farrand Controls, Inc. of Valhalla, New York, and the wafer resolver, allowed phase-moduled signals to be obtained from a transducer of much smaller volume. Both the Inductosyn and the wafer resolver utilize planar conducting printed patterns and operate on the principle of variable magnetic coupling between patterns on the stator and rotor. With current printed-circuit technology, very great accuracy can be obtained with extremely small transducers of this type. This type of transducer has the further advantage of a very broad signal bandwidth. However, because the Inductosyn or wafer resolver has conducting patterns on both the rotor and stator, it requires a separate power or signal channel between the rotor and stator. When no mechanical contacts are allowed, a rotary transformer is usually used, but it occupies a substantial volume and results in a substantial loss of signal strength. Moreover, undesirable harmonics were generated by the device.

Further development of the Inductosyn device permitted a reduction in the undesirable harmonics generated therein as described in the following report:

"Optimal Harmonic Reduction In Periodic Switched Wave Forms", James F. Rhodes, C.S. Draper Laboratory Report T-527, January 1970.

A subsequent developed device called the reluctosyn is a printed-pattern transducer combining the advantages of a wafer resolver or Inductosyn and a microsyn to provide signals that are phase-modulated functions of mechanical angle without the requirement of a rotary transformer or mechanical contacts.

The stator of the reluctosyn contains planar conducting printed patterns that are similar to those used in a wafer resolver or in an Inductosyn, with the difference being that the patterns are broken into separate individual poles which are connected in a separate external circuit. Such a device is described in U.S. Pat. No. 3,641,429 issued to Cox, Jr. et al. on Dec. 24, 1969.

Other devices for providing angular measurements include differential transformer transducers, inductance bridge transducers and shorted-turn signal generators. Differential transformer transducers operate on the principle of variable coupling between a primary and two secondary windings. The fact that the two secondaries are generally conneced in series opposition accounts for the "differential" natureof this device. Both sets of windings are placed within the stator, while ferromagnetic material on the rotor is responsible for variations in the primary to secondary coupling as a function of rotor angle. In the null position, the rotor produces the same coupling from the primary to each secondary. As the rotor moves from the null position, the coupling to one secondary increases as that to the other secondary decreases. Both the magnitude of the output voltage of each secondary and it phase relative to the excitation voltage are thus related to the extent of this coupling.

In inductance bridge transducers, the motion of the rotor simultaneously increases the inductance in one stator coil and decreases the inductance in the other stator coil. Two arms of a four-arm AC brigde consist of this matched pair of stator coils. Assuming that the inductance variations in each secondary are small relative to their nominal inductance, the output of the bridge is precisely proportional to the inductive difference between the two secondary coils.

The shorted-turn signal generator comprises four poles, each would with only one coil. One pair of diametric poles forms the primary (excitation) windings, while the remaining diametric pole pair becomes the secondary (receiver) windings. A shorted-turn on the rotor is used to couple signals from one pole pair to the other. The output voltage, appearing across the secondary pole pair, is then a function of the rotor's angular displacement.

The above discussed printed pattern devices are subject to further disadvantages in that eddy currents and discontinuities produce undesirable errors in the signal outputs thereof. Moreover, the patterns in such devices must be extremely accurately aligned in order to provide the best operation. Any stretching of the bands on which they are printed causes the patterns to deform and the linearity of the device is lost.

Such printed pattern devices have been used to provide three-axis attitude read-out systems for inertial navigation applications for determining angular displacements on a spherical surface, for example. When fabricated for such purposes the devices become even more expensive and complex due to the whole angle readout calculation which is required and to the data processing needed for attitude determination. This added complexity gives rise to reliability problems.

Devices for measuring displacements along a line have been suggested, such devices, for example, being in the form of linear potentiometers wherein a wire wound or conductive plastic resistance element has a movable contact which moves along the line formed thereby to produce a change in resistance proportional to the distance moved. Such devices may be formed as straight line devices or as curvilinear devices, in which latter case angular measurements can also be made. Linear potentiometers, however, have relatively low accuracy and problems arise in maintaining the linearity of the signal over the entire resistance element. Moreover, the need for a contact between the pickup and resistance element tends to reduce the life thereof, as well as to prevent the use in applications wherein free movement (i.e., "out of contact" movement) is required between the pickup component and the resistance element.

Another device suggested for linear position sensing has been disclosed in U.S. Pat. No. 2,947,929 issued Aug. 2, 1960 to J. L. Bowen; the device uses a magnetic medium having a magnetically recorded track the magnetization of which is a function (normally a line function) of the distance along the track. A pair of saturable reactor reading heads measure the change in the phase relationships between their outputs as they move together along the track from a reference point. The resolution thereof is extremely poor and is limited to no better than one-quarter wave length of the magnetization pattern.

In the nuclear research area, the use of magnetostrictive elements for determining positions on a planar surface, have been suggested in the early 1960's. For example, one method and structure of locating track coordinates in a spark chamber in order to measure position in a plane has been disclosed in the following publications:

1. "A Simple Method Of Increasing Magnetostriction Signals In Spark Chambers With Magnetostrictive Readout" — V. Bohmer et al., Nuclear Instruments and Methods 96 (1971), pages 601–603.
2. "Magnetostrictive Readout for 'Wire Spark Chambers'" — V. Perez-Mendex et al., Nuclear Instruments and Methods 33 (1965), pages 141–146.
3. "Construction And Performance Of Large Wire Spark Chambers With Magnetostrictive Read-Out"— G. Grayer et al., Nuclear Instruments and Methods 99 (1972), pages 579–587.

The coordinates on such a plane are determined by forming a grid pattern of perpendicularly intersecting magnetostrictive wire or ribbon elements, the intersections forming a plurality of coordinate points on the plane. A specific coordinate point can then be determined by digitizing the time delay from a trigger signal at a reference point to the arrival of the magnetostrictive pulse at a pick-up coil situated at the coordinate point to be measured. Such devices are dependent upon the time measurement of travelling pulsed acoustic signals and, accordingly, may not provide sufficient accuracy for use in many applications. A similar form thereof for measuring planar coordinate positions using magnetostrictive elements is shown in U.S. Pat. No. 3,648,277, issed to Whetstone et al. on Mar. 7, 1972. Such a device is similar in nature to the spark chamber devices described above and suffers from the same disadvantages as to accuracy. Further, such devices cannot be successfully used in measuring displacements on curved surfaces as they cannot be effectively adapted for 3-axis attitude readout, or other open or closed curved surface for linear, curvilinear, or angular measurements.

Other devices for locating a position along a line have been suggested utilizing magnetostrictive elements. One such device is made and sold under the tradename "Temposonic" Linear Displacement Transducers, as manufactured by Tempo Instruments, Inc., Plainview, New York. Such device uses the torsional mode of vibration and also the technique of measuring the time interval for such torsional mode sonic pulse to travel along a magnetostrictive wire in order to determine the distance between two points along the wire. Measurements of time delays by the use of torsional pulsed sonic signals provide insufficient accuracy for many applications. Moreover, such devices are used only for linear displacements and, accordingly, have never been adapted to yield displacement information with respect to a planar or other curvilinear surface or for use in measuring angular displacements. Moreover, they cannot be effectively adapted to 3 axis attitude readouts.

SUMMARY OF THE INVENTION

The invention overcomes the disadvantages of the above discussed prior art devices and provides for linear or angular measurements or measurements of positions on a planar or curved surface, as for 3 axis attitude read-out determination, for example. The embodiments of the invention generally can be manufactured at substantially less cost than the more complicated of the above-described devices since little precision work is required and the electronic circuitry required for use therewith is considerably simplified. Despite the simplicity and lower costs thereof, the invention can provide a high degree of accuracy in producing displacement information without the introduction of errors due to problems of eddy currents, discontinuities, misregistration, and stretching.

Further, the invention is inherently linear due to the wave propagation phenomena and theoretically has an infinite resolution. It is more accurate than the printed pattern devices because the position measurement is dependent on the phase of one signal and not on the amplitude and phase of two signals.

Another advantage of the invention is its variable resolver multispeed capabilities. The resolver speed of this device is controlled by the frequency of the driving signal and is not fixed, as in the printed pattern devices.

Moreover, because of the reduction in manufacturing complexity, the use of relatively simple transducer elements, and the use of relatively simple electronic circuitry in association therewith, a reduction in power consumption can be achieved. Improved accuracy can be achieved because of better linearity particularly where, in comparison with printed pattern systems, the systems of the invention can be arranged to provide direct angular readouts, for example, or incremental angular readouts. Overall, the invention provides improved reliability and smaller volume requirements so that it can be utilized in applications where spatial requirements are limited. Moreover, there is no need to generate computer programs which are required to draw the printed patterns during the manufacture of the prior art system so that savings in the time and costs thereof are achieved.

In accordance with the invention, a delay element capable of supporting a travelling acoustic wave, such element being in the form of a magnetostrictive element, for example, is used to determine an angular or linear displacement or a displacement along a planar or curved surface. The displacement measurement generally depends upon a measurement of the phase of a continuing wave travelling acoustic signal in the delay element relative to a reference phase. The magnetostrictive delay element may be in the form of one or more bands, rods, single wire or multi-wire structures, etc. formed in straight or curved line configuration. Such delay elements may be formed in other than bands, rods, wires, etc., such as in planar or curved shell-type structures, as described in more detail below. Further, the bands, rods, shells, etc. may be homogeneous magnetostrictive materials or may include non-magnetostrictive portions as, for example in configurations having a nonmagnetostrictive core plated with a material exhibiting magnetostrictive properties or a configuration using serially coupled segments of different materials. The use of phase measurements in some preferred embodiments of the invention as opposed to the time delay measurements used in other certain prior art devices greatly increases the accuracy which is achievable.

In summary, the invention uses sonic wave supporting delay elements which can be arranged in various embodiments to provide for linear position information or angular position information for single, dual and multiaxis geometry. In a particular arrangement the invention can provide resolver operation as a superfine, highly accurate transducer that generates signals phase-modulated by a shaft angle or by linear motion. Further, such resolver operation can provide variable speed operations. Further, the invention can provide position information with respect to a plane or a curved surface, and, in particular, for example, as a 3-axis attitude readout apparatus for measuring spatial orientation. Further, the invention can be used in a dual delay element configuration to provide planar position sensing, wherein either delay element can be used as an input device to provide an input signal or as an output device to pick up the output signal. Moreover, the device can be used in a band-less form to provide planar or spherical surface position sensing.

DESCRIPTION OF THE INVENTION

The invention can be described in more detail with the assistance of the accompanying drawings wherein FIG. 1 shows an effective block diagram of one embodiment of the invention for providing a single axis position determination;

Figure 1:
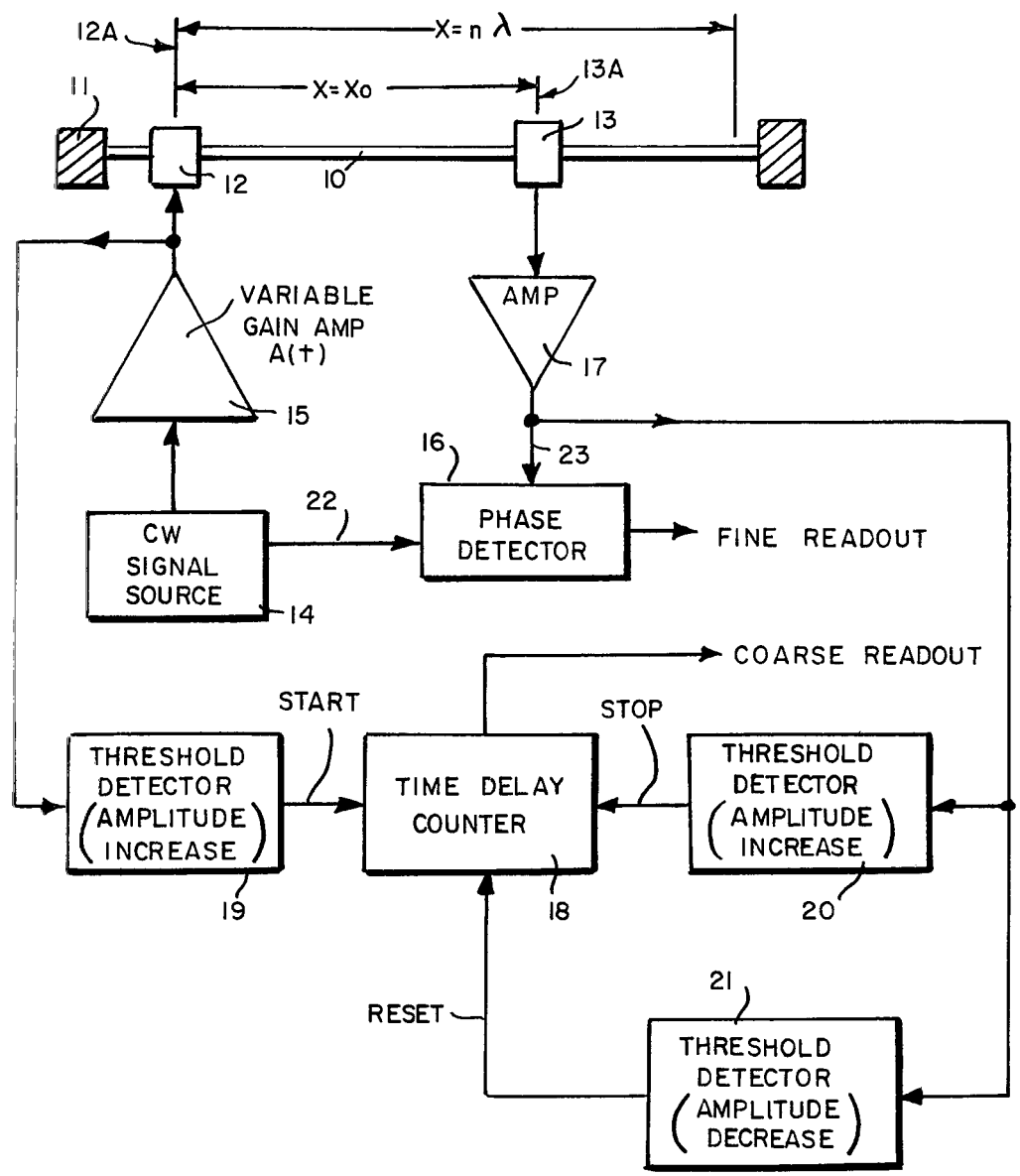

As shown in FIG. 1 the invention can be utilized to determine a linear position along a single axis. As depicted therein, the invention comprises a magnetically coupled delay line element 10 which, in a preferred embodiment, can be a rod of ferromagnetic material having magnetostrictive characteristics. Alternatively, the element 10 may be a single wire, or a bundle of wires or any other magnetically coupled element which can support a travelling acoustic wave. The element 10 is mounted at either end in a termination block 11 which is fabricated so as to provide a means for absorbing the acoustic wave which impinges thereon. Such material may be clamped rubber, other similar elastomer material, or lead for such purpose.

An input or transmitting transducer 12 is arranged to be appropriately coupled at a selected reference point or reference region along the magnetostrictive element 10, corresponding to the reference line 12A, for example, for providing an excitation thereof to produce a travelling acoustic wave on the element, as explained in more detail below. A receiving transducer 13 is located at a position, corresponding to reference line 13A, for example, to be determined with respect to the reference position of the input transmitting transducer 12. Thus, as shown therein, it is desirable to determine the distance $X_0$ between the input and output transducers 12 and 13.

In the particular embodiment of FIG. 1, the transmitting transducer 12 is supplied with a continuous wave electrical signal for exciting a continuous travelling wave acoustic signal. Such electrical signal is obtained through an appropriate continuous wave signal source 14 which is fed to the transmitting transducer via a variable gain amplifier 15, as explained below. The output of signal source 14 is also fed to one input of an appropriate phase detector 16 which may be of a conventional type for determining the phase difference between a pair of input signals. The other input of phase detector 16 is obtained from the electrical output of receiving transducer 13 via a suitable amplifier 17 so that the input signals 22 and 23 of phase detector 16 are of comparable levels. The output of variable gain amplifier 15 is fed to the "Start" input of a time delay counter circuit 18 via threshold detector circuitry 19. The output of amplifier 17 is fed to the "Stop" input of a time delay counter 18 via a threshold detector circuit 20. The latter output signal is also fed to a threshold detector circuit 21 which detects a decrease in amplitude thereof to provide a reset signal for the reset input of time delay counter 18. The operation of the system shown in FIG. 1 can be summarized as follows.

Figure 2:
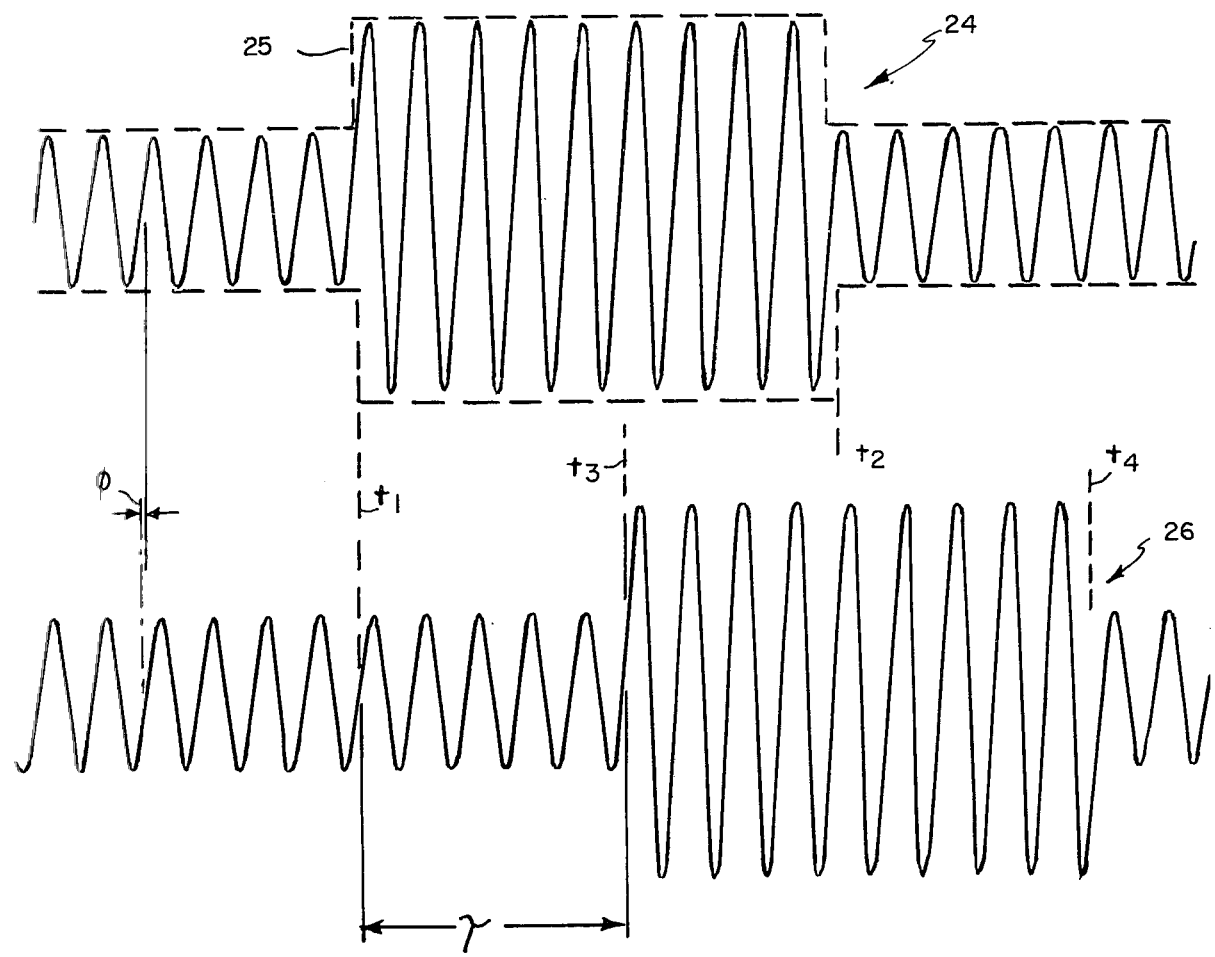
FIG. 2 depicts wave forms helpful in understanding the operation of the embodiment of FIG. 1.

The variable gain amplifier 15 has a gain characteric A(t) as shown by the dashed line envelope 25 of wave form 24 in FIG. 2 wherein the gain is increased in a step function at time $t_1$ and decreased in a step function at time $t_2$. The acoustic wave which is thus excited for travel along the magnetostrictive element 10 increases its amplitude sharply at time $t_1$ and decreases its amplitude sharply at time $t_2$. The received wave signal is appropriately amplified following its pickup by receiver transducer 13 and is shown by wave form 26 in FIG. 2A. The increased threshold level of the received wave is not picked up at the receiver transducer until a time $t_3$, after a time interval $\tau$, shown in FIG. 2A, which represents the time of travel of the input wave along magnetostrictive element 10. Such time of travel is utilized to determine the "coarse" position readout of the receiver transducer 13.

Thus, threshold detector 19 provides an output signal when the threshold level at the output of variable gain amplifier 15 increases (at $t_1$) so as to start the count of time delay counter 18. When the threshold level increase is detected at time $t_3$ (where $t_3 - t_1 = \tau$) by threshold detector 20 in the output signal from amplifier 17, a stop signal is supplied from detector 20 to stop the counter 18. The number of integral cycles so counted then determines coarsely the approximate distance $X_0$ which is directly measured by the time interval $\tau$ and a knowledge of the speed of travel of the acoustic wave within the magnetostrictive element 10. In order to provide a fine readout of the distance, a measurement of the phase shift between the transmitted signal and the received signal is required, such phase shift being depicted in FIG. 2 as phase shift $\phi$ which is the same in any comparable cycle of wave form signals 24 and 26.

The counter 18 can be reset by detecting the time $t_4$ at which the threshold level of the received signal decreases from its higher to its lower level, as shown in FIG. 2A, at which point the output of threshold detector 21 provides a reset pulse signal so that the counter can be reset to zero so as to be able to resume its counting for the next measurement.

The position of receiving transducer 13 is thereby determined extremely accurately by the determination of the phase shift of the acoustic wave signal as it travels down the magnetostrictive delay line.

Figure 3:
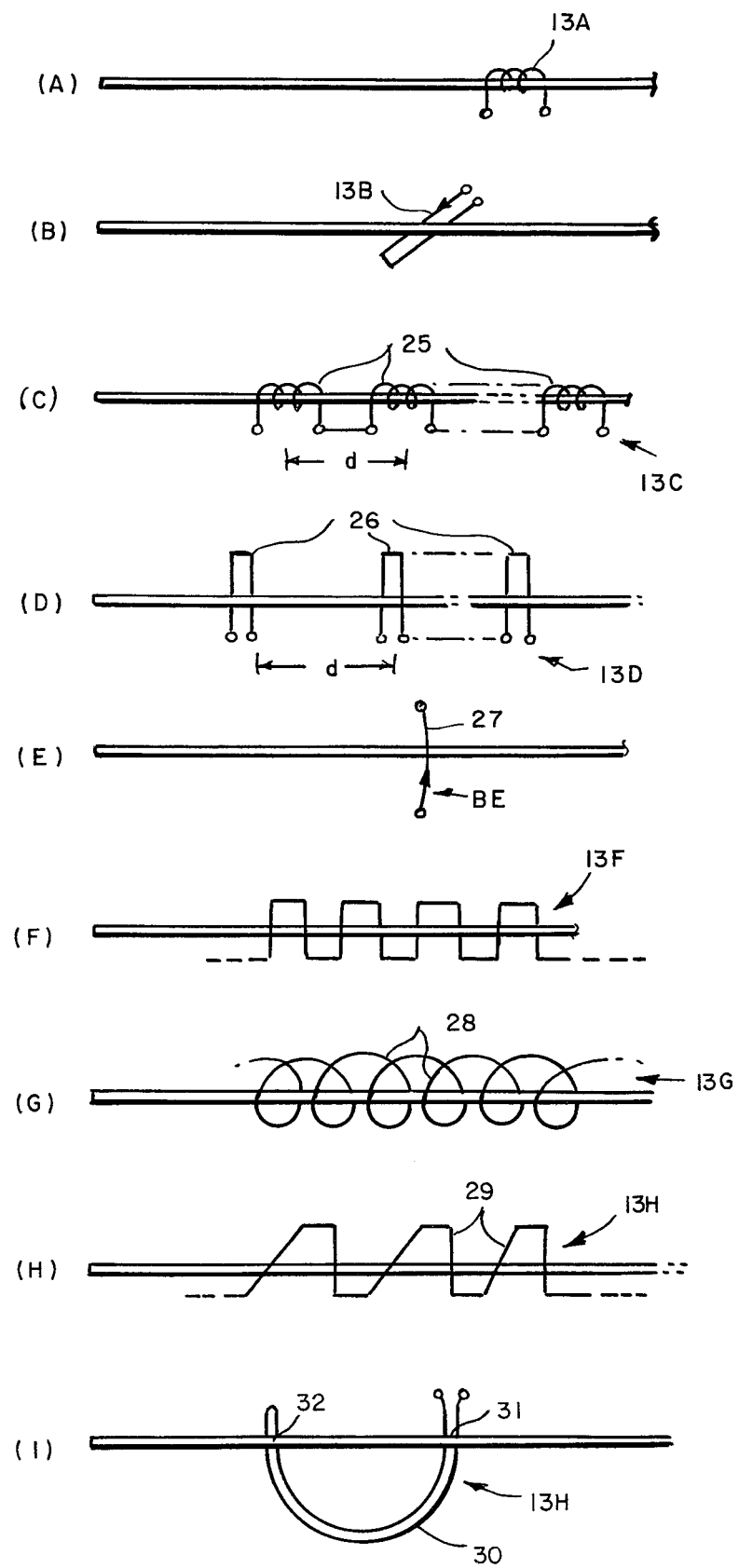
FIG. 3 depicts a plurality of different embodiments of the transducer elements of the invention.

The receiving transducer can assume a variety of different exemplary forms (A) through (I) as shown in FIG. 3. In form (A), the receiving transducer is a coil 13A which is concentrically wound around magnetostrictive element 10. Form (B) uses an N-turn loop 13B (only one turn is shown for simplicity) which is placed adjacent the delay line. Form (C) shows a plurality of coils 25 for transducer 13C, all of such coils being spaced from each other by a distance $d$ which is equal to one wave length of the acoustic wave signal which travels along the magnetostrictive delay line. Form (D) shows a plurality of loops 26 for transducer 13D, such loops being separated by a distance $d$ equal to one wave length as in (C) above.

Form (E) is a single conductor 27 positioned adjacent the delay line as shown by transducer 13E, while form (F) is a conductive element 28 in the form of a square wave pattern placed adjacent a selected length of the delay line 10, the period of the square wave being substantially equal to the period of the acoustic wave signal as shown by transducer 13F. Form (G) is a plurality of circular loops 28 forming a conductive path as shown by transducer 13G, such loops being wound around magnetostrictive element 10 in a periodic pattern having a period substantially equal to the wave length of the acoustic wave. Form (H) is a conductive element in the form of a trapezoidal pattern 29 as shown by transducer 13H, the period, as above, being substantially equal to the period of the acoustic wave.

In the forms generally shown as (F), (G) and (H) in FIG. 3 the receiving transducer pattern may be used to determine either the overall changer in the position of the receiver transducer from a reference point, or the incremental change in such position over a single period of the receiver transducer pattern, that is, the incremental changes thereof as the receiver transducer moves relative to the delayline. In the latter instance, the receiver transducer motion is limited to an amount which is less than one wave length, in which case the input signal need not be modulated in any way and a measurement of the phase difference between the input acoustic travelling wave and the received travelling wave across the end points of the receiver transducer pattern provides a direct measurements of the incremental position change of the receiver transducer relative to the delay line. In the former instance, where the receiver transducer is moved by an amount which is greater than one wavelength, it is necessary to provide a coarse measurement as discussed above. One way to do so would be to use an appropriate counter to count each time one wave length of the receiver pattern has been traversed. The fine measurement is then obtained by a measurement of the phase difference of the input wave and the received wave across the end points of the receiver transducers of (F), (G), or (H).

Although the transducer patterns (F), (G) and (H) are referred to as receiver transducers, they can also be used as driver transducers by excitation thereof by a signal across their end points, in which case the transducer 12 of FIG. 1, for example, is used as a receiver transducer. Such a configuration tends to provide a cleaner signal and a better signal to noise (S/N) ratio.

Thus, a continuous measurement of the change in position of the receiver transducer may be obtained or, if desired, the absolute position of a stationary receiver transducer relative to a reference position can be obtained.

Form (I) is a conductive loop 30 having a configuration such that two points thereof are effectively positioned adjacent the magnetostrictive element, as shown by transducer 13H, which is adjacent delay line 10 at the points 31 and 32. Other forms of the receiving transducer may also occur to those in the art within the spirit and scope of the invention.

Further, the transmitting transducer may also assume one of the forms shown in FIG. 3. While such transducers are shown as being magnetically coupled to the magnetostrictive element, they may alternatively be formed in any other manner which would provide for the excitation of an acoustic wave at the transmitting end and pickup of the acoustic wave at the receiving end. Such forms may include mechanically coupled elements driven by electrical signals such as piezoelectric crystals, for example, or driven by mechanical means, such as vibrators, etc., and indeed any other transducer elements known to those in the art which will produce an acoustic wave in element 10 or which will pick up an acoustic wave therefrom can be used.

While the embodiment of FIG. 1 has been described in connection with its use in measuring a position along a line, such device can also be used in a manner equivalent to previously known electrical resolvers. Such devices are used to measure angular changes, i.e., the total number of revolutions through 360 electrical degrees and partial revolutions thereof that may have occurred. The output of receiver transducer 13 provides a direct readout of such an angular measurement when compared with a zero reference angle at the input transducer 10.

Figure 19:
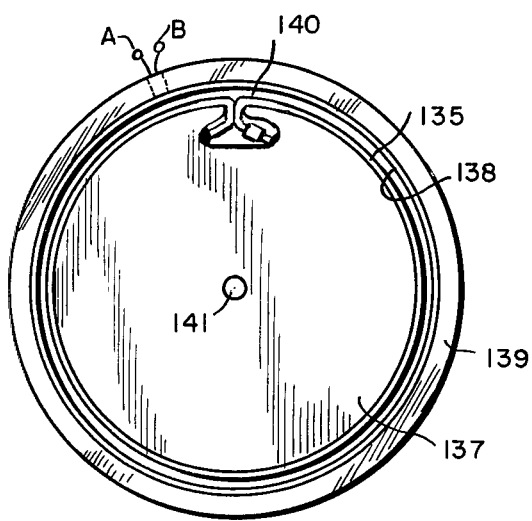
FIGS. 19, 20 and 21 depict alternative embodiments of the invention for providing resolver operation.
Figure 20:
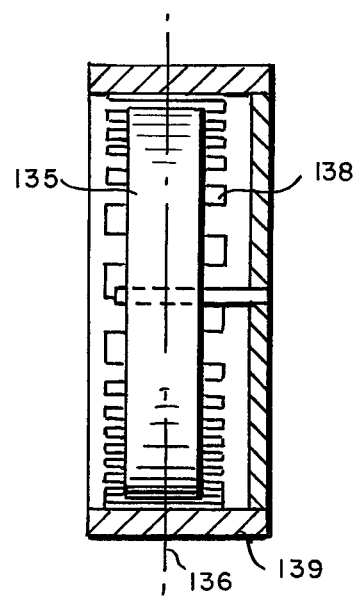

One specific embodiment of the invention for use as a resolver can utilize a receiver transducer element in the form of a wave pattern similar to those discussed with reference to forms (F), (G) and (H), for example, of FIG. 3. One such embodiment, which can be referred to as having a co-planar resolver configuration, is depicted in FIGS. 19 and 20. A first input band 135 of magnetostrictive material is formed in a circular configuration substantially in a plane 136 on the outer surface of a rotatable cylinder 137. A second receiver band 138, co-planar with input band 135, is formed on the inner surface of a concentric cylindrical member 139. The receiver band 138 is in the form of a periodic wave pattern, such as a square wave pattern, for example, which extends substantially completely around the input band 135, the outer cylindrical member 139 also forming a housing for the device. The input band 135 has an input transducer element 140 which can be excited to generate a travelling acoustic wave signal along the inner band 135. The ends of the receiver transducer band pattern 138 are available at points A and B. The input cylinder 137 is mounted, for example, on a shaft 141 so as to be rotatably movable relative to the receiver band, the latter being held stationary.

Thus, the angular displacement of the input band relative to the receiver band can be determined to produce a resolver operation. In accordance therewith, a travelling acoustic signal is generated for travel along the input band by excitation of the input transducer element 140 and the distance of travel thereof with respect to a point on the receiver band pattern can then be determined. The coarse distance from a reference point can be determined, for example, by counting the number of wavelengths of the receiver transducer band pattern 138 which are traversed by the travelling acoustic wave, via an appropriate counting means (not shown) in a manner which would be well known to those in the art. The fine distance, i.e., the distance within one wavelength of the receiver pattern, can be determined accurately by comparing the phase of the received signal picked up by the receiver transducer pattern relative to the phase of the input signal generated at input transducer element 140 as a reference. Accordingly, the desired resolver measurement of the angular position of the input band relative to the receiver band can be determined to a high degree of accuracy.

Figure 21:
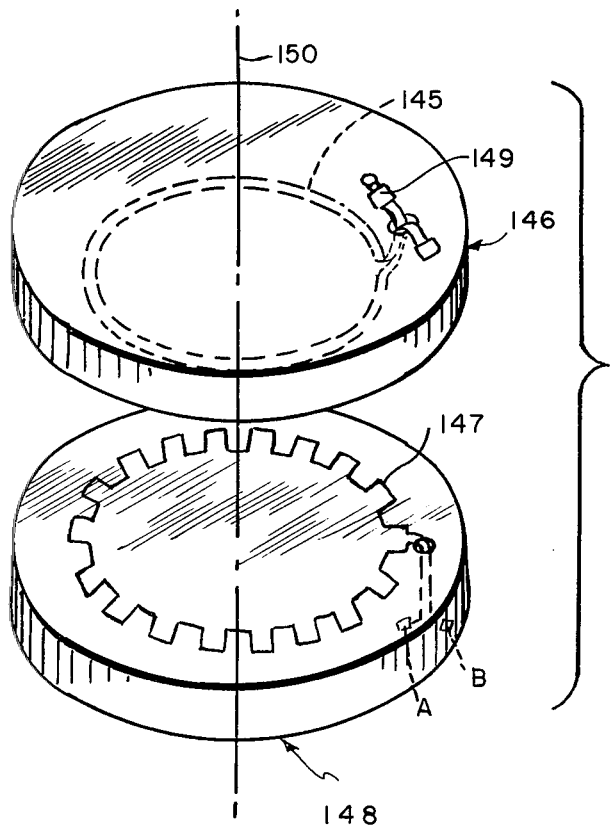

An alternative form of the co-planar device of FIGS. 19 and 20 is shown in FIG. 21 which can be referred to as a disk type resolver configuration. As seen therein, a magneto-strictive input band 145 is placed on a flat side of a first disk 146 which is mounted adjacent a second disk 148 having a receiver transducer pattern 147 placed thereon. The disks are mounted so that the position of the input band 145 on the lower side of dish 146 is opposite to and aligned with the position of receiver pattern 147. The ends of input band 145 are brought out through an opening in disk 146 to the upper side thereof where they are appropriately mounted. An input transducer 149 is utilized to generate a travelling acoustic wave signal along band 145 as discussed above. The ends of receiver transducer wave pattern 147 are available at points A and B at the opposite of disk 148.

The disks are mounted so as to be relatively movable in rotation with respect to each other. Thus, disk 148 may be held stationary, for example, and disk 146 mounted to be rotated about axis 150. The course and fine measurement of the angular position of the rotating disk in thereupon measured in a manner such as discussed above with reference to FIGS. 19 and 20.

Although the configurations of FIGS. 19–21 are described specifically as being mounted so that the input band rotates relative to a stationary receiver band, it is clear that the input band may be held stationary and the receiver rotated or that both bands be mounted so as to rotate relative to each other. In any case a measurement of the angular position of one relative to the other can be made with a high degree of accuracy.

In some applications the device of FIG. 1 may be used to replace presently known resolvers the output signals of which are not direct angular measurements but rather represent the "sine" and "cosine" components thereof, appropriate calculations being made therewith to determine the angle which is being measured. Thus, such outputs may represent, for example, "sin" and "cos $\theta$", the angle $\theta$ then being calculated as $\tan^{-1}$ (sin $\theta$)/cos $\theta$). In such applications it may be desirable to retain the presently used calculation system while instituting the device of FIG. 1 for the previously used resolver device only, in which case the device of FIG. 1 which provides a direct angle measurement must be modified to provide the sine and cosine components thereof instead.

Figure 4:
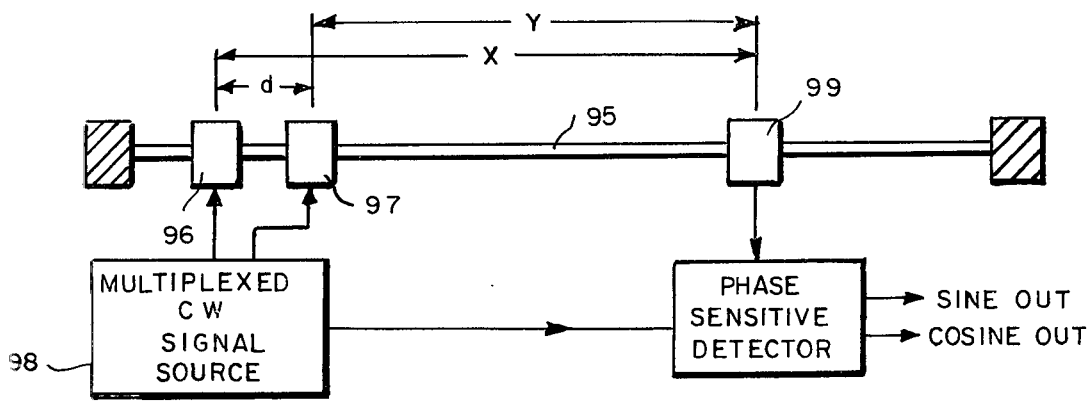
FIGS. 4 and 5 depict alternative embodiments of the invention of FIG. 1 for use in providing resolver operation.

Such a device is shown in FIG. 4 wherein the input transducer system coupled to delay line element 95 is in the form of two input transducers 96 and 97 which are located at a distance $d$ from each other. The input transducers are alternately excited with a continuous wave signal from a multiplexed signal source 98. The distance $d$ is made equal to $(\lambda/4 + N2\pi)$, where $\lambda$ is the wavelength of the excitation signal and N can be 0, 1, 2, 3, . . . etc. A pair of acoustic continuous wave signals are thereby successively generated along delay lie 95, such waves differing in phase by 90° (or λ /4). The acoustic waves are successively picked up at receiver transducer 99, the successive outputs of which are fed to a phase sensitive detector 100, which successively provides output signals, the amplitudes of which vary as a function of the phase of the input signals thereto. Accordingly, sine wave and cosine wave components are successively present at the outputs of phase sensitive detector 100, which components are appropriately used, as in presently known electrical resolvers, to provide a suitable angle calculation as shown.

Figure 5:
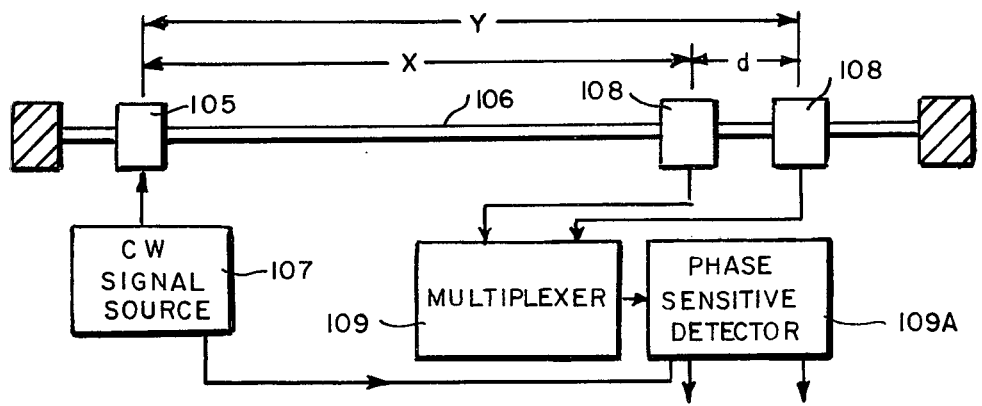

The embodiment of FIG. 4 can be modified to provide the desired output components in a manner shown in FIG. 5 in which a signal input transducer 105 is coupled to a delay line element 106. An input continuous wave signal is applied thereto from a source 107 whereupon an acoustic continuous wave signal is generated along delay line 106. A pair of output transducers 108 are coupled to delay line element 106 and are positioned at a distance $d$ apart from each other. As above, the distance $d$ is equal to ($\lambda/4 + N2\pi$). The outputs of transducers 108 are fed to a suitable multiplexer 109, the output of which is fed to a phase sensitive detector 109A, the outputs of which represent the desired sine and cosine components, respectively, so that the appropriate angle calculation can be made, as above.

Unlike prior art resolver devices in which the frequency of the wave pattern utilized therein is fixed and cannot be dynamically changed, the resolver configurations of the invention permit the design of a "variable speed" resolver, i.e., one in which the frequency of the excitation wave can be varied. Such variation can be accomplished by varying the frequency of the input wave from CW signal sources 98 and 107, for example.

Figure 6:
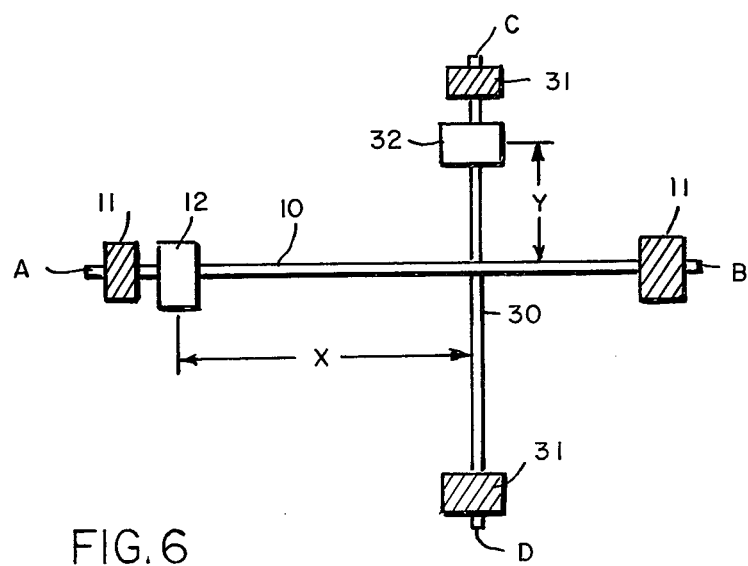
FIG. 6 depicts an embodiment of the invention for determining the position on a planar surface.

A determination of a position in an X-Y, or two-axis, system can be made with the use of a structure as shown in FIG. 6. A pair of delay line elements such as magnetostrictive rods 10 and 30 are positioned at a known angle with respect to each other (one such known angle can be a right angle as shown in the specific embodiment depicted) and are movable relative to each other along the X and Y axes in such a manner that the values of X and Y as shown therein vary. Each of the magnetostrictive elements is mounted in a pair of terminal blocks at its end as shown by terminal blocks 11 and 31 in the manner discussed above with reference to FIG. 1. Each delay line has an input transmitting transducer such as transducers 12 and 32, respectively, as shown in FIG. 6. In each case the magnetostrictive element itself acts as a receiver transducer for determining the X and Y positions.

Thus, in order to determine the X position, the input transducer 12 is excited with an appropriate continuous wave signal to provide an acoustic wave signal along element 10, as discussed above with reference to FIG. 1. The magnetostrictive element 30 effectively acts as a receiver transducer and provides a received signal across points C and D in the same manner discussed with reference to the receiver transducer of FIG. 1, element 30 acting in a manner analogous to the single wire embodiment of FIG. 3(E). Appropriate circuitry as discussed above can thereby be utilized to determine the position of magnetostrictive element 30 along the axis represented by magnetostrictive element 10 and, hence, the distance X as shown in FIG. 6.

In a similar manner, in order to determine the Y position, input transmitting transducer 32 is excited by an appropriate continuous wave signal for generating an acoustic wave along delay line 30. In this case element 10 acts as a receiver transducer to provide a received signal across points A and B which can be utilized with appropriate circuitry, as discussed above, for determining the distance from input transducer 32 to magnetostrictive element 10 and, hence, the distance Y as shown in FIG. 6. The principles of operation discussed with reference to the two-dimensional position determination can be extended to three or more dimensions if required.

The configuration of FIG. 6 may be operated in another manner to achieve the same results. Thus, the delay elements 10 and 30 may be used as input transducers and the transducers 12 and 32 may be used as received transducers. Accordingly, in order to obtain a measurement of X the delay line 30 may be excited by applying an appropriate input signal across its ends C and D, the excitation thereof providing an acoustic travelling wave along delay line 10 which is thereupon received by transducer 12, the received signal being then utilized with appropriate circuitry, as discussed above, to determine the distance from delay line 30 to transducer 12. Similarly the distance Y may be measured by excitation of delay line 10 across its ends A and B, which generates an acoustic travelling wave along delay line 30 which is received by transducer 32.

Alternatively, the configuration of FIG. 6 can also be operated so that the input or driver elements for such measurements are always associated with the same delay element. For example, the measurement of X may be made by excitation of transducer 12 to generate an acoustic travelling wave along delay element 10 which is received across the ends C and D of delay element 30. The measurement of Y may be made by excitation of delay element 10 across its ends A and B to generate an acoustic travelling wave along delay element 30 which is received by transducer 32. Conversely, delay element 30 and its transducer may be used as driver elements with delay element 10 and its transducer 12 being used as receiver elements in the same manner.

Figure 7:
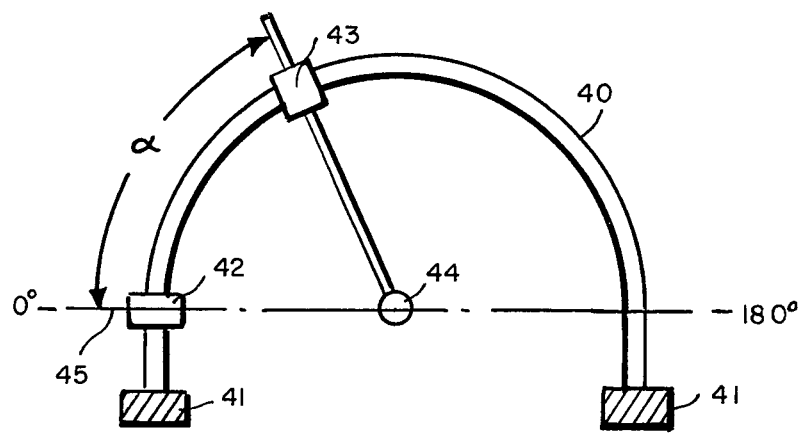
FIG. 7 depicts an embodiment of the invention for determining an angular position about a single axis.

The principles of the invention can also be utilized to make a determination of angular position as shown in FIG. 7. For such purpose a magnetically coupled delay line such as a rod or band of magnetostrictive material 40 can be formed in a circular arc, such as a semicircle as shown and held at termination blocks 41. An input transducer 42 is fixedly located along a reference line 45 and a receiver transducer 43 is pivotally mounted at a pivot point 44 so as to be rotatably moved from a 0° reference angle along line 45 to a final reference angle at the other end of said line, shown as 180° reference angle in FIG. 7. Accordingly, a continuous wave signal applied to transducer 42 will excite an acoustic wave in element 40 which wave will travel along element 40 and be received by receiver transducer element 43 at the angle to be determined with reference to the 0° reference angle. The distance travelled along element 40 can be readily calculated in angular terms so that an accurate measurement of the angle can be made. The measurement may alternatively be made by using transducer 43 as the input transducer and transducer 42 as the output transducer.

Figure 8:
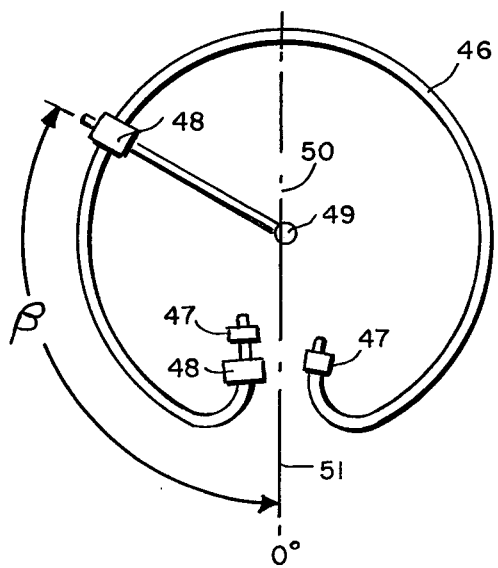
FIG. 8 depicts an embodiment of the invention which is a modification of the embodiment of FIG. 7.

The principles of FIG. 7 can be extended to provide angular measurements effectively over a 360° range in accordance with the configuration shown in FIG. 8, wherein a delay line magnetostrictive element 46 is fashioned in the form of a substantially complete circle and the receiver transducer 48 is pivotally mounted at the center 49 thereof. The ends of delay line 46 are appropriately mounted in termination blocks 47. An input transmitting transducer 50 is effectively mounted along a 0° reference line 51 so that the angle $\beta$ with reference thereto can be measured by the reception at transducer 48 of an acoustic wave which is generated so as to travel from input transducer 50 along magnetostrictive element 46. Interchanging the functions of transducers 48 and 50 can be provided for as discussed above with reference to FIG. 7.

Figure 9:
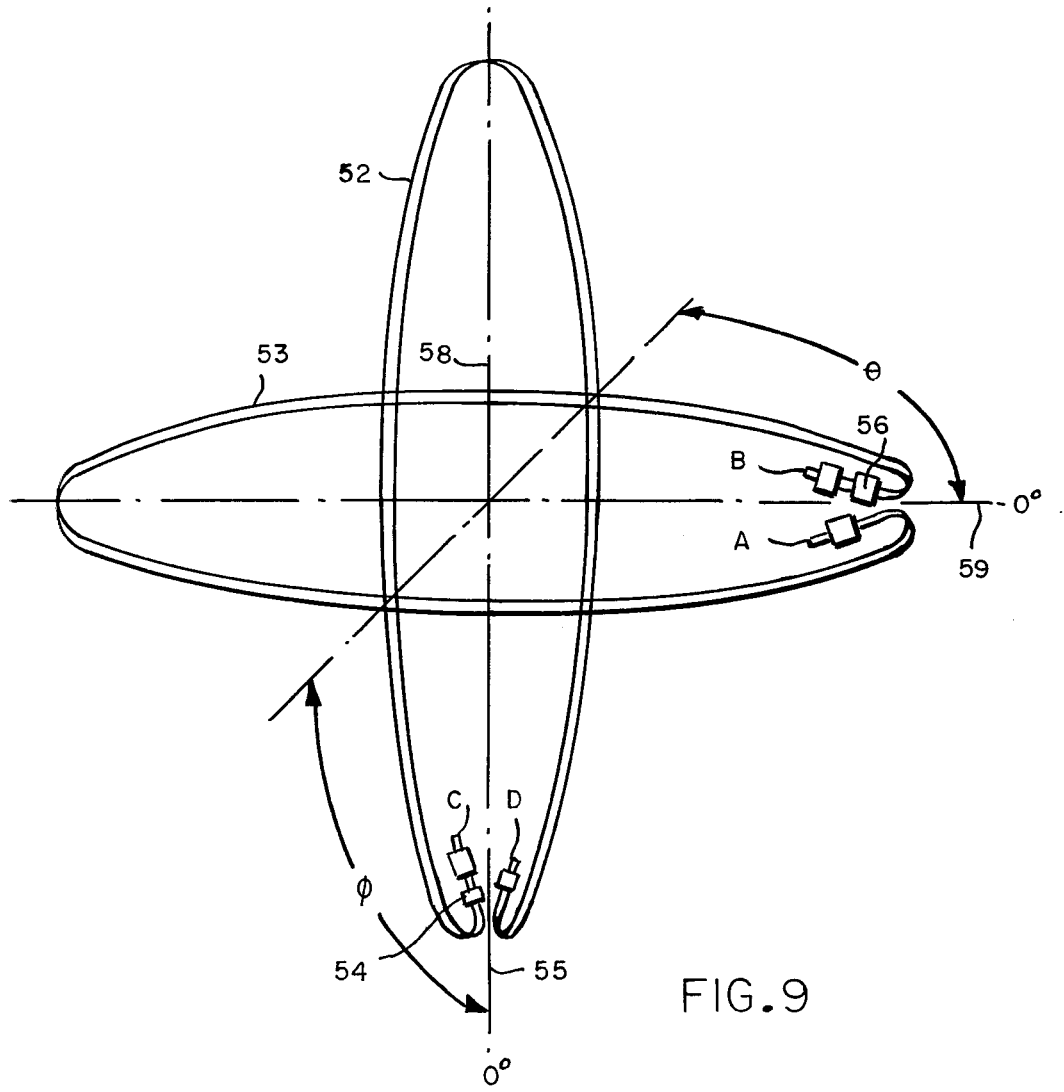
FIG. 9 depicts an embodiment of the invention for determining angular positions in a two-axis system.

The concepts of FIG. 8 can be extended to a two-axis angular position measuring system in the manner shown in FIG. 9 wherein delay line elements 52 and 53 are arranged at a known angle with respect to each other (arranged to provide mutual orthogonality in the specific embodiment of FIG. 9) to provide for angular measurements $\phi$ and $\theta$, as shown. One delay line element can act as a receiver for the other delay line element in a manner analogous to the planar position measuring device discussed with reference to FIG. 6. Thus, in order to measure the angle $\phi$ an input transducer 54 is excited to produce an acoustic wave which travels along delay line element 52. The orientation of delay line element 53 with reference to a 0° reference line 55 in the plane of element 52 determines the angle $\phi$ and element 53 acts as a receiver transducer for producing a received continuous wave signal across points A and B thereof. In a similar manner the angle $\theta$ can be measured by exciting an acoustic wave via input transducer 56 for travel along element 53, in which case delay line element 52 acts as a receiver transducer and its orientation with respect to a 0° reference line 59 determines the angle $\theta$ in accordance with the received wave produced across points C and D.

In a manner similar to that discussed above with reference to FIG. 6, the configuration of FIG. 9 may be operated so as to apply an input excitation signal across delay line 53 so as to generate an acoustic travelling wave along delay line 52 to be received at transducer 54 in order to measure the angle $\phi$ and to apply an input excitation signal across delay line 52 so as to generate an acoustic travelling wave along delay line 53 to be received at transducer 56 in order to measure the angle $\theta$.

Further, as discussed above with reference to FIG. 6, if it is desired that the driver transducers be associated with one of the delay elements, transducer 54 and delay line 52 may be used an input elements and delay line 53 and transducer 56, respectively, used as receiver elements. Alternatively, the functions of such elements may be interchanged as discussed above.

Figure 10:
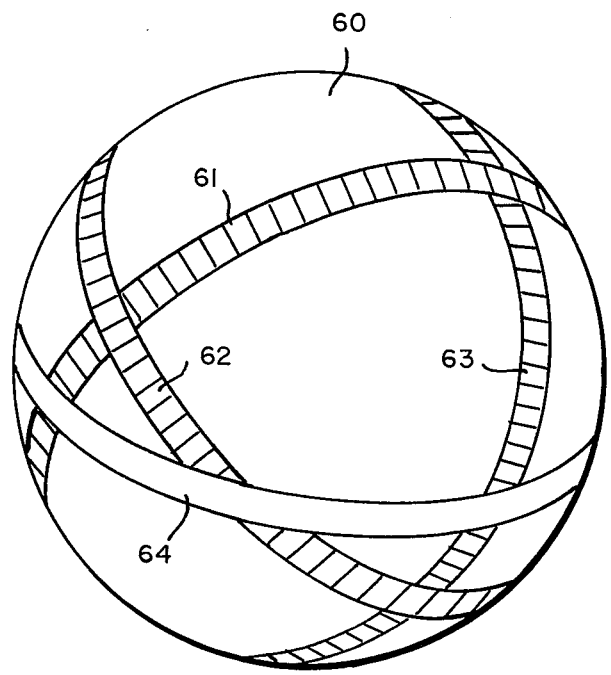
FIG. 10 depicts an embodiment of the invention for providing a three-axis attitude readout system.

Use of the principle of the invention as discussed above with reference to the two-axis system of FIG. 9, for example, can be made in extending the principles to provide a three-axis attitude readout system as shown in FIG. 10. The configuration thereof is based on the "floated ball" concept wherein, as is well-known in the art, an inner spherical platform 60 is encased within a spherical shell (not shown). The sphere 60 reposes or floats, in a liquid, within the shell. The inner spherical platform is usually stabilized to maintain a substantially fixed position with respect to designated reference coordinates, while the outer spherical shell is permitted to move freely relative to the inner sphere.

In accordance with the principles of the invention, three separate magnetostrictive element driver bands 61, 62 and 63 are orthogonally mounted on the surface of spherical platform 60 while the concentric spherical shell has a receiver band 64 located on its inner surface. The magnetostrictive element bands 61, 62 and 63 are mounted in terminal blocks (for simplicity, not shown) within sphere 60 in a manner similar to that shown with respect to FIG. 9, for example, and each has a transducer (not specifically shown) appropriately mounted thereon at one end thereof within the sphere in substantially the same manner. The receiver band 64 is mounted in terminal blocks (not shown) external to the shell and has a transducer appropriately mounted at one end thereof. Receiver band 64 is used to determine the angular relationships between itself and each of the driver bands in the manner discussed with reference to FIG. 9, wherein its two angular relationship with each of the driver bands can be determined separately and consecutively so that the angular position thereof with reference to each of the driver bands on the spherical surface 60 can be suitably calculated.

Thus, in order to make each of such angular measurements, the technique discussed above with respect to FIG. 9 can be used. For example, excitation of the transducer on driver band 61 and pick up by receiver band 64 provides a first angular measurement, while excitation of the transducer on receiver band 64 and pick up by driver band 61 provides the second angular measurement, the same method being used with respect to each of the driver bands relative to the receiver band.

While, in general, measurements of the angular relationships between only two driver bands with respect to the receiver band (and, hence, the outer shell on which it is mounted) are required to completely define the angular position of the outer shell relative to the inner stable spherical platform 60, such measurements are not possible when the receiver band is oriented so as to be substantially parallel to, and contiguous with, a particular driver band. In such a case, measurements of the angular relationships between the other, non-parallel driver bands can be made. Accordingly, three driver bands are used to provide information concerning all relative orientations of the outer shell and inner sphere.

Although the above technique of exciting the driver band and the receiver band transducers and of picking up the travelling wave signal with the corresponding band can be used, the specific structure required for applying the excitation signals and for obtaining the received signals and supplying them to an appropriate means for computing the angles involved may be relatively complicated. The overall structure may be simplified by utilizing the driver bands only for excitation. by the input signals and by utilizing the receiver band only for picking up the received signals and for supplying them to a suitable angle computer. In this way, all of the driver excitation components can be mounted together within the sphere and all of the receiver and computation components can be mounted together externally to the outer shell.

In such a case, measurements of the angles involved can be made, first, by exciting the transducer of a particular driver band to produce an acoustic travelling wave along the driver band which is then picket up by the receiver band to provide a first received signal across the receiver band and, second, by exciting the driver band itself by applying a signal across its ends to produce an acoustic travelling wave along the receiver band which is then picked up by the transducer of the receiver band to provide a second received signal at the latter transducer.

Figure 11:
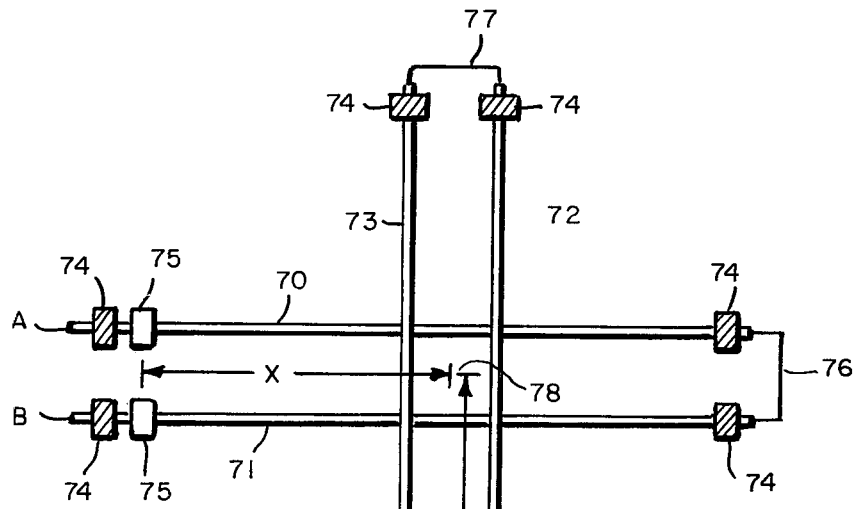
FIG. 11 depicts a modification of the embodiment shown in FIG. 6.

Although in the above configurations, the magnetostrictive elements used in each case are in the form of single rods, wires, or bundles of wires, etc., it is often desirable to improve the signal to noise ratio when such apparatus is used in relatively noisy environments. Such improvement can be accomplished in the manner shown with reference to FIG. 11. Although the discussion relates to the configuration of FIG. 6, the same principle can be used in the other configurations discussed above. In FIG. 11, a first pair of parallel mounted magnetostrictive elements 70 and 71 are mounted so as to have a known angular relationship with respect to a second pair of parallel mounted magnetostrictive elements 72 and 73. In the embodiment depicted, the elements are mounted orthogonally, although in a general case the angular relationship can be other than orthogonal. Each element is mounted at its ends in termination blocks 74 and each element has an input transducer 75 associated therewith. The elements 70 and 71 are electrically connected via an appropriate conductor 76 and when used as a receiver transducer can provide an output signal across points A and B. Similarly, elements 72 and 73 are electrically connected via conductor 77 and when used as a receiver transducer provide an output signal across points C and D.

In order to determine the position X, effectively representing the distance from input transducers 75 on elements 70 and 71 to the center point 78 (representing the average distance of elements 72 and 73 therefrom), the input transducers of elements 70 and 71 are excited simultaneously with a continuous wave signal so as to produce simultaneous acoustic waves along magnetostrictive elements 70 and 71, which waves are simultaneously received by elements 72 and 73 to produce a received continuous wave signal across points C and D, which received signal can be used as discussed above to provide an accurate measurement of the distance X.

A similar measurement can be performed for determining the distance Y by excitation of the input transducers 75 of elements 72 and 73 and reception by elements 70 and 71 acting as receiver transducers to produce a continuous wave received signal across points A and B.

In accordance with the configuration of FIG. 11, the use of a pair of magnetostrictive elements in each case provides increased signal strengths so that the overall signal-to-noise ratio is improved and the apparatus becomes extremely useful in environments subject to noise problems.

As discussed above, the functions of the transducers and delay lines can be interchanged and the driver functions may be associated with one pair of delay line elements and the receiver functions associated with the other pair thereof.

Figure 12:
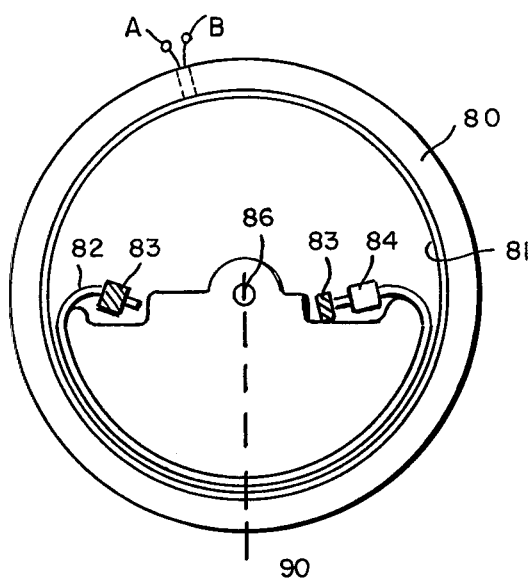
FIGS. 12 – 14 depict an embodiment of the invention for providing a precision pendulum system for determining a reference position relative to a vertical direction.
Figure 13:
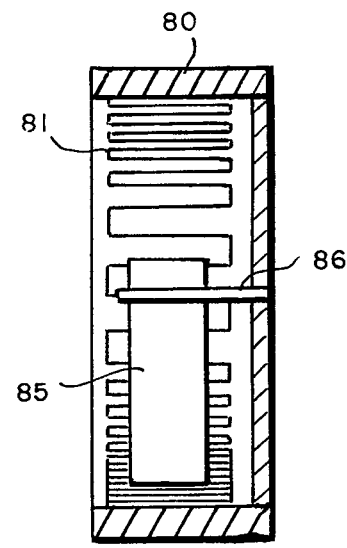
Figure 14:

The principles of the invention can be utilized to provide a reference to a vertical direction through the use of an appropriate precision pendulum configuration, as shown in FIGS. 12–14. As depicted therein, an outer cylinder 80 is used to house a pendulum 85 which is movable relative to cylinder 80 by being pivotally mounted along axis 86. In a gravitational field, the pendulum 85 assumes a vertical orientation along the direction 90 as shown.

A receiving transducer is formed on the inner surface of cylinder 80 in the form of a conductive transducer element 81 in a square-wave loop pattern which is depicted in FIG. 13 and is shown in linear form in FIG. 14. The receiving transducer pattern extends completely around and adjacent the inner surface of cylinder 80, its ends being made available at points A and B, as seen in FIG. 12.

Pendulum element 85 is in the form of a substantially solid half cylinder having an outer peripheral surface, the configuration of which corresponds to the inner surface of cylinder 80. A magnetostrictive element 82 is positioned around the outer surface of pendulum 85 as shown in FIG. 12 and is mounted thereon in termination blocks 83 at its inner ends. An input transmitting transducer 84 is mounted as shown in FIG. 12 at one end of magnetostrictive delay line element 82. Outer cylinder 80 is fixedly attached to a movable component whose vertical axis it is desired to stablilize, such as a ship, for example, in an oceanographic application. The purpose of the pendulum structure is to determine when the component (and, hence, the cylinder 80) is in a position off the vertical 90 and to measure the angular offset therefrom, such measurement providing information for use in an appropriate servomechanism system to move the component back to its vertical position so that stabilization thereof occurs. For such purpose it is desirable to determine the angular displacement of cylinder 80 with reference to the vertical direction 90 of the pendulum 85. Such angular direction can be readily determined by exciting magnetostrictive element 82 with a travelling wave and determining the distance of travel along the receiving transducer loop pattern and accurately determining the phase shift with reference to the specific pattern cycle so that a measurement of the angle can be readily determined, as discussed above. A direct measurement of the position of the outer cylinder with reference to the vertical direction can then be made so that appropriate correction or other use thereof can be made.

Although the configuration shown in FIG. 12 utilizes a magnetostrictive element on the pendulum and a receiver transducer element on the cylinder, such elements can be interchanged so that the magnetostrictive element can be mounted on the inner surface of the cylinder and the receiver transducer element pattern placed on the outer peripheral surface of the pendulum structure.

Such an apparatus can be useful in providing an accurate pendulum for use in numerous aerospace, oceanographic and industrial applications wherein direct electrical reference to a vertical direction is needed. Such devices may be used to control, or record, pitch and roll angles on seagoing vessels or other marine devices such as torpedoes, or to maintain a remote component in a level orientation with reference to a vertical direction, or to measure angles on industrial equipment so as not to exceed safe limits or maximum allowable angles of operation, or to provide an attitude reference to determine a specific reference from a known angle.

Although the above embodiments of the invention generally disclose the use of a ferromagnetic material in a delay line configuration as in the form of rods, wires, bands, and the like, the invention is not necessarily limited to the use of only such forms thereof. Thus, the delay element may be in the form of a planar element, or plate, for example, to provide a determination of a position on a planar surface.

Figure 15:
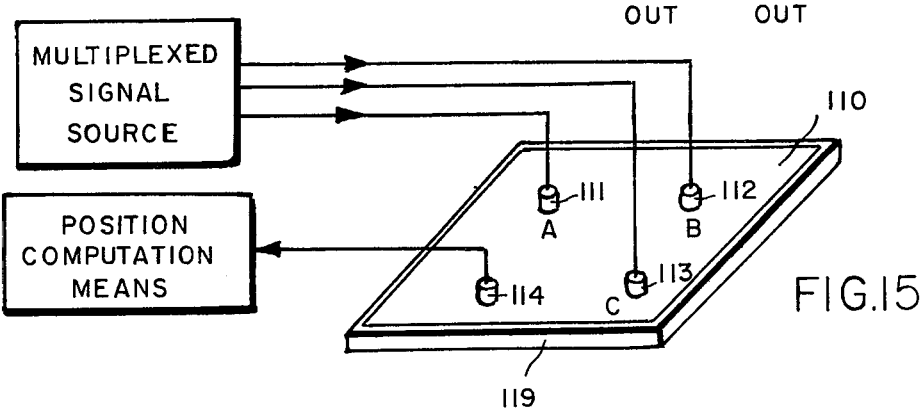
FIGS. 15, 16 and 16A depict an alternative embodiment of the invention for determining a position on a plane surface.
Figure 16:
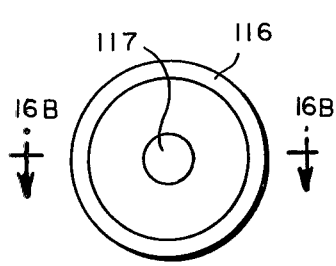
Figure 16A:
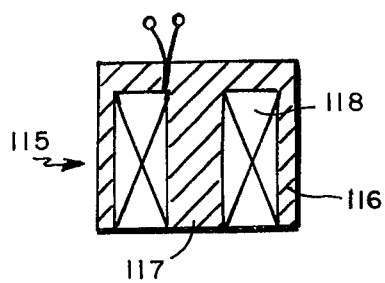

In the specific configuration shown in FIG. 15, the delay element is a plate, or sheet, 110 of ferromagnetic material. Three input transducer elements 111, 112 and 113, shown in more detail in FIGS. 16 and 16A, are positioned at points, or regions, A, B and C, respectively, on the surface of plate 110. A receiver transducer 114 in the form of a coil, for example, is located adjacent a position to be determined on the surface of plate 110, as shown.

Each of the input transducer elements may be formed, for example, as shown in FIGS. 16 and 16A wherein a cylindrical ferrite core 115 has an outer shell 116 closed at one end thereof and an inner core leg 117 on which is wound a coil 118, as shown. The open end of shell 116 of each transducer element is placed into contact with the surface of plate 110 and the coils thereof are appropriately and successively excited with a suitable electrical signal from a suitable multiplexed signal source and such coils thereupon generate omnidirectional acoustic wave signals in plate 110 emanating from each of the regions at which each of the input transducers is placed. The acoustic wave signals from each of the input transducers are suitable damped by a damping material 119, such as clamped rubber, which is used around the edges of plate 110 so as to provide a termination strip which prevents reflection of the acoustic waves at the discontinuities formed by such edges. Such acoustic wave signals are picked up by receiver transducer 114 to provide signals representing the distances from each input transducer to the receiver transducer. An appropriate calculation can be made at a suitable computation means from the information provided by such signals and from information of the known positions of the input transducers on plate 110 in accordance with known "triangulation" techniques to determine the position of the output transducer 114 thereon.

Figure 17:
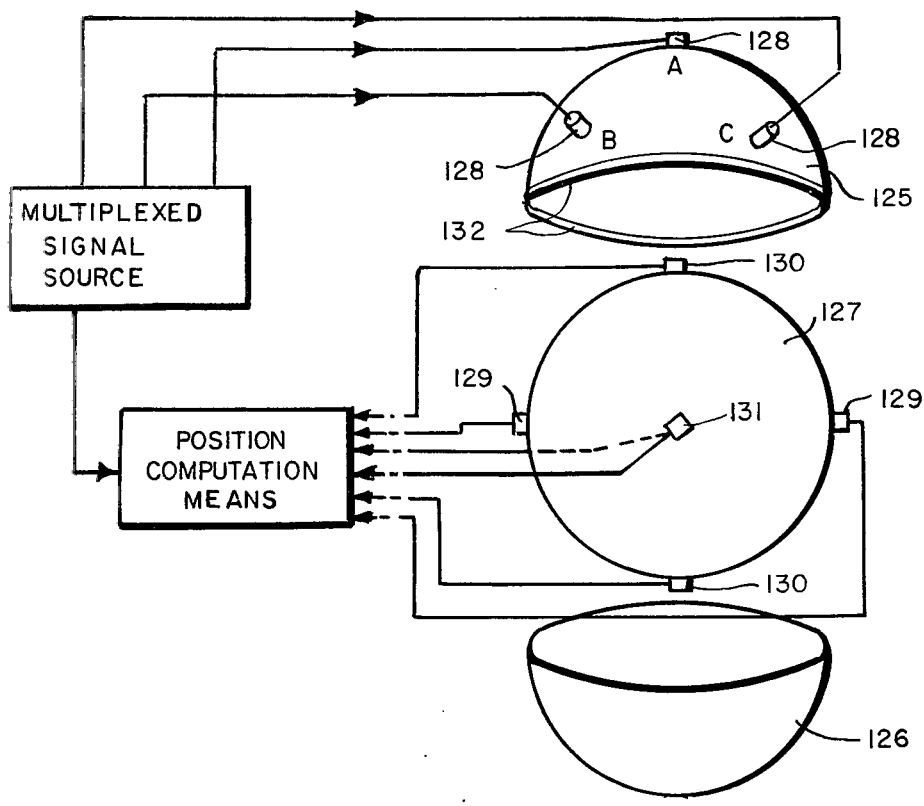
FIGS. 17 and 17A depict alternative embodiments of the invention for determining a position on a spherical surface.
Figure 17A:
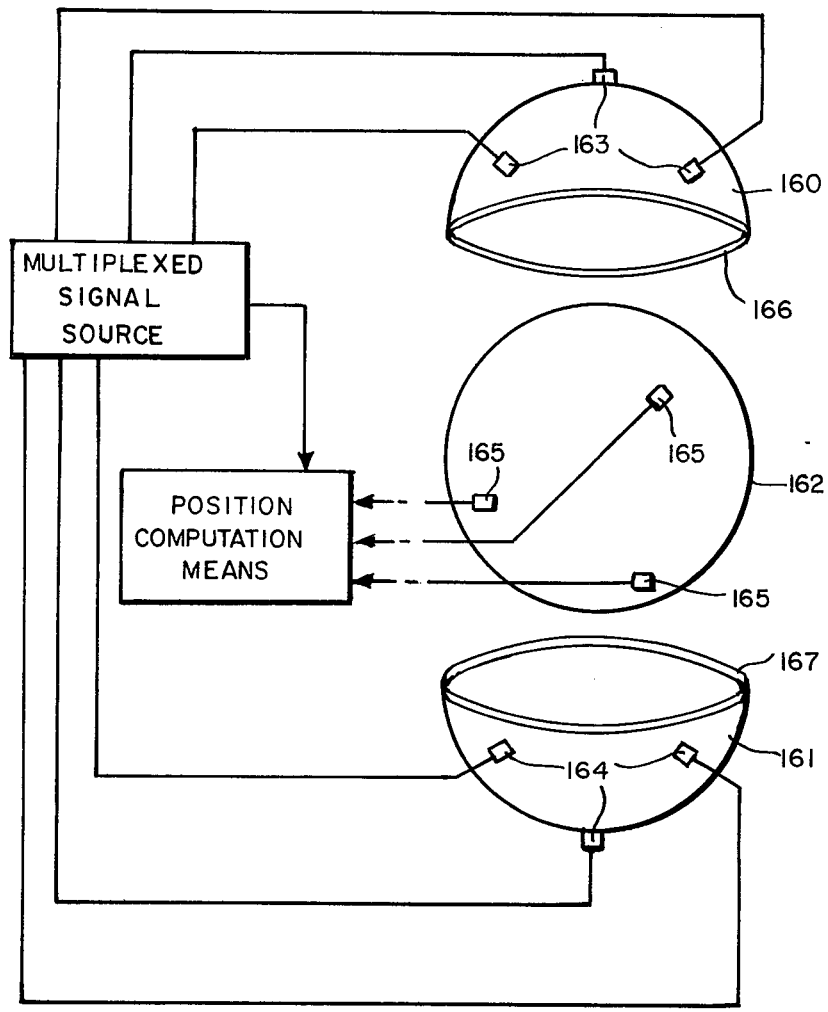

The principles of operation shown in FIG. 15 can be extended to a curved surface, as shown in the embodiments of FIGS. 17 and 17A. In FIG. 17, for example, a pair of hemispherical shells 125 and 126 are used to form a spherical outer shell concentrically mounted with reference to an inner sphere 127, the latter being in effect a stabilized spherical platform as discussed with reference to FIG. 10. Three input transducer elements 128 are positioned on the outer surface of hemispherical shell 125 at known points, or regions A, B and C, respectively. Six receiver transducers, shown as transducer pairs 129, 130 and 131, are placed on the outer surface of inner sphere 127 adjacent the inner surface of shells 125 and 126. The six receiver transducers are positioned in pairs at the end points of three mutually orthogonal axes passing through the center of sphere 127, as shown (only one of the transducers of pair 131 can be seen in the figure). The input transducers 128 are driven by a suitable multiplexed signal source so as to produce omni-directional acoustic travelling wave signals in hemispherical shell 125 successively emanating from each of the input transducers which signals are received by those of the receiver transducers which are adjacent the inner surface of shell 125. The input transducers may be of the form shown in FIGS. 16 and 16A and the receiver transducers may be of the type discussd above with reference to FIG. 15. Appropriate triangulation techniques are used to provide a measurement of the position of the inner sphere 127 relative to the outer sphere formed by hemispherical shells 125 and 126 via a suitable position computation means which compares the received signals picked up by those of the receiver transducers 129, 130 and 131 which have detected the presence of the acoustic wave signal on hemispherical shell 125 with the transmitted signals from the multiplexed signal source. A suitable damping material 132, such as clamped rubber, may be placed around the periphery of hemispherical shell 125 to prevent reflections of the acoustic wave signals at the discontinuity formed thereby.

An alternative embodiment of the configuration shown in FIG. 17 is shown in FIG. 17A wherein a pair of hemispherical shells 160 and 161 enclose an inner sphere 162, as before. Three input transducers 163 are placed at arbitrarily selected but known positions on the outer surface of shell 160 and three input transducers 164 are placed at arbitrarily selected but known positions on the outer surface of shell 161, as shown. Three receiver transducers 165 are placed at known positions on the outer surface of inner sphere 162 adjacent the inner surfaces of shells 160 161. The position of receiver transducers 165 are selected so that they do not all lie on a common plane which passes through any great circle of sphere 162. The input transducers are driven by an appropriate multiplexed signal source so as to produce omnidirectional acoustic travelling wave signals in hemispherical shells 160 and 161 emanating successively from each of the input transducers. The presence of such signals are appropriately detected by the receiver transducers 165. Suitable triangulation techniques are used by an appropriate position computation means to provide a measurement of the position of inner sphere 162 relative to the outer spherical shell formed by shells 160 and 161 by suitable comparisons of the receiver transducer signals with the transmitted signals from the multiplexed signal source. As above, suitable damping materials 166 and 167 are placed on each of the peripheries of shells 160 and 161.

In many applications the embodiment of FIG. 17 may be preferred to that of FIG. 17A since in the former embodiment only a single hemispherical shell (shell 125) need be precisely made and aligned with inner sphere 127 and only a single damping strip need be used at the discontinuity region.

The replacement of line, or band, delay line elements with planar, or curved, surface delay elements provides advantages in some applications. In the configuration of FIGS. 17 and 17A, for example, the heat transfer from the inner sphere to the outer shells tends to be improved in comparison to the heat transfer capability of a band type configuration such as shown in FIG. 10. Moreover, a reduction in the electronic components normally required to be mounted within the inner sphere in the latter configuration can be achieved. Further, the assembly and disassembly of the apparatus for maintenance and repair purposes, as well as the mounting of the overall structure during use is simplified. Since the hemispherical shells of the type required in FIGS. 17 and 17A are used in presently known systems and are, therefore, generally available, they can be used in such configurations without the need for designing new components. Accordingly, the overall costs of manufacture are reduced.

Many of the discontinuity problems, particularly with regard to magnetic bias problems at discontinuity points, and other interface problems at cross-over and termination points of the configuration of FIG. 10 are effectively eliminated by the configurations of FIGS. 17 and 17A. Moreover, the signal to noise ratio should also be improved. An additional advantage of the structure of FIGS. 17 and 17A is that the input and output transducers can be positioned in such a manner that the time delay measurements provide direct readout information, i.e., information directly corresponding to the angles being measured, so that the data processing required to attain the desired attitude information is greatly simplified.

In using the delay elements of the invention, particularly the delay line elements of the rod or band type as shown in various embodiments discussed above, variations in temperature may produce errors in the measurements involved due to changes in the phase propagation velocity of the acoustic wave which travels along the line as well as to changes in the length of the line as a function of temperature changes. Errors due to length variations are of less significance than phase velocity errors and the length changes can be relatively easily compensated for by mounting the delay line in a non-rigid manner at its ends so that increases in length do not vary the "active" length of the delay line, so that the direction of the delay line does not change, and, hence, the characteristics of the acoustic travelling wave signal do not change as the delay line expands or contracts.

Figure 18:
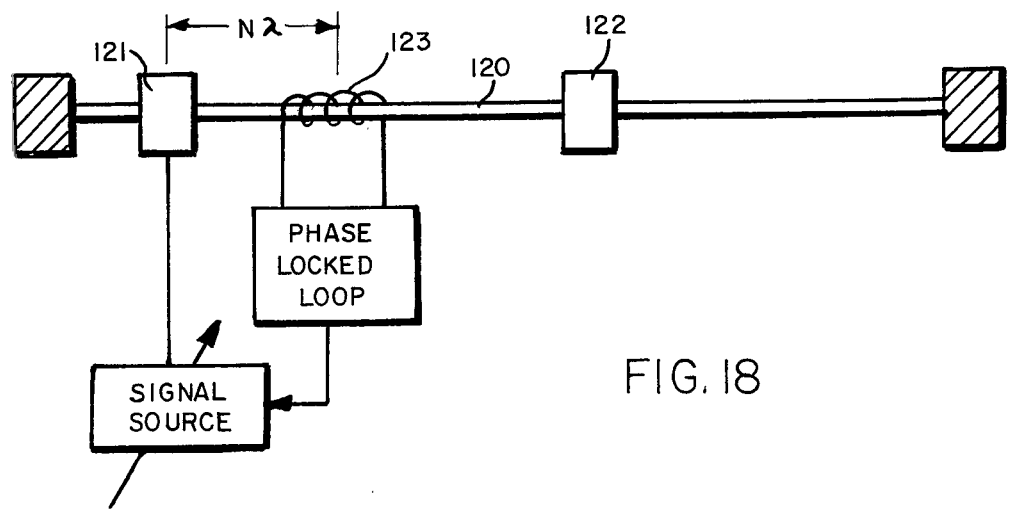
FIG. 18 depicts an embodiment of the invention which illustrates means for compensating for operation of the invention with temperature changes.

Phase velocity errors can be compensated, for example, in the delay line configuration having input and output transducers 121 and 122 as shown in FIG. 18 by utilizing a reference transducer 123, such as a reference pickup coil, coupled to the delay line 120 at a fixed distance from the input transducer 121. A comparison is made of the difference between the phase of the reference pick up signal at transducer 123 and the phase of the input signal in a phase-locked loop circuit which changes the frequency of the input signal effectively to reduce said phase difference to zero. Any convenient phase-locked loop circuit known to the art can be used. In this way, even in view of temperature variations, the phase velocity can be maintained substantially constant by appropriately controlling the frequency of the input signal.

While in the embodiments discussed above normally the input or driver transducer is shown at a fixed reference position and the receiver transducer moved with respect thereto, the functions of the input and receiver transducers may be effectively interchanged. Thus, in some applications, the receiver transducer may be maintained at a fixed reference point and the input, or driver, transducer, or transducers, moved with respect thereto so that the relative distance, or distances, therebetween can be measured in substantially the same manner. Further, while the means for providing a magnetic bias for the magnetically coupled delay elements discussed in the various embodiments of the invention described above are not specifically shown, it is clear that many suitable means for providing such magnetic bias are well known to those in the art and, accordingly, need not be depicted in detail here.

Other variations in the particular structures of the transducers or modifications of the configurations discussed in the various embodiments of the invention may occur to those in the art within the spirit and scope of the invention. Hence, the invention is not to be construed as limited to one or more of the particular embodiments shown and described herein except as defined by the appended claims.

What is claimed is:

1. A position determining apparatus comprising at least one delay element having magnetic properties and capable of establishing electromagnetic fields associated with travelling continuous elastic wave signals in the delay element;
   at least one transducer means coupled to said delay element at a reference position;
   means for activating said at least one transducer means to produce electromagnetic fields associated with at least one continuous elastic wave signal which travels in said delay element;
   at least one electromagnetic transducer means positioned adjacent but not enclosing said delay element and electromagnetically coupled to said delay element at said position to be determined relative to said reference position, said at least one transducer means being capable of moving in its entirety in the same direction or in a substantially orthogonal direction relative to the direction of said travelling continuous elastic wave signals, said at least one electromagnetic transducer means detecting the presence of electromagnetic fields associated with said travelling continuous elastic wave signal as it travels past said position to produce a detected continuous wave signal;
   means responsive to said detected continuous wave signal and to said activated continuous wave input signal for determining the position of said at least one electromagnetic transducer relative to said reference position, said position determining means including
   means for comparing the phase of said detected continuous wave signal as detected at said position to be determined with the phase of said activated continuous wave input signal at said reference position; and
   means for substantially reducing reflections of travelling elastic waves in said delay element.

2. An apparatus in accordance with claim 1 wherein said at least one element is an electromagnetically coupled delay line forming a substantially straight line path having two ends;
   said at least one transducer means is an input transducer located at a reference point on said path;
   said at least one electromagnetic transducer means is an output transducer positioned adjacent but not enclosing said delay line and located at said position to be determined along said path; and
   said continuous elastic wave travels along said delay line from said input transducer to said output transducer.

3. A position determining apparatus comprising at least one nonfluid delay line element having magnetic properties and capable of establishing electromagnetic fields associated with unidirectional elastic wave signals in the delay line element, said delay line element forming a specified curved path;
   a first reference point having a preselected spatial relationship with said curved path;
   at least one transducer means coupled to said delay line element at a reference position which forms a reference line with said first reference point;

means for activating said at least one transducer means to produce electromagnetic fields associated with at least one elastic wave signal which travels in said delay line element;

at least one electromagnetic transducer means positioned adjacent, but not enclosing, said delay element and electromagnetically coupled to said delay element at a second position, the line between said second position and said reference forming an angular position to be determined with respect to said reference line, said at least one electromagnetic transducer means detecting the presence of said electromagnetic fields associated with said travelling elastic wave as it travels past second position to produce a detected signal; and means responsive to said detected signal and to said activated signal for detrmining said angular position relative to said reference line.

4. An apparatus in accordance with claim 3 wherein said activating means produces a continuous unidirectional elastic wave signal and said position determining means includes means for comparing the phase of said detected continuous wave signal with the phase of said activated continuous wave signal;

said apparatus further including means for substantially reducing reflections of travelling elastic waves in said delay element.

5. An apparatus in accordance with claim 4 wherein said curved path is at least part of a circular path; and said first reference point is the center of said circular path.

6. An apparatus in accordance with claim 5 wherein said circular path is substantially a full circle.

7. A position determining apparatus comprising at least one first delay line element capable of supporting a first travelling elastic wave signal in a direction along a first specified path;

at least one first transducer means coupled to said delay line element at a first position;

means capable of activating said at least one transducer means to produce at least one elastic wave signal which travels in said at least one first delay line element;

at least one second delay line element capable of supporting a second travelling elastic wave signal in a direction along a second specified path different from said first specified path and coupled to said at least one first delay line element at a common position, said at least one first delay line element and said at least one second delay line element each capable of detecting the presence of a travelling signal in the other delay line element as it travels past said second position;

at least one second transducer means coupled to said at least one other delay line element at a second position;

means capable of activating said at least one second transducer means to produce at least one elastic wave signal which travels along said at least one other delay line element;

each of said delay line elements being capable of detecting the presence at said common position of an elastic wave signal travelling along the other of said delay lines; and each of said delay line elements including means responsive to the detected signal in the other delay line element to its own activated signal for determining said first and second positions relative to said common position.

8. An apparatus in accordance with claim 7 for determining a position in a preselected plane wherein said at least one first delay line element includes at least one delay line forming at least a first substantially linear path having two ends and lies in said preselected plane; and said at least one second delay line element lies in said preselected plane and includes at least one delay line forming at least a second substantially linear path at a preselected angle with respect to said first path in said preselected plane, said second path having two ends.

9. An apparatus in accordance with claim 8 wherein said elastic wave signals are continuous wave signals and further including means for substantially reducing reflections of said travelling continuous elastic wave signals in said delay line elements.

10. An apparatus in accordance with claim 8 wherein said preselected angle is a right angle.

11. An apparatus in accordance with claim 8 wherein said at least one first delay line element comprises a first pair of parallel delay lines forming a first pair of parallel paths, a corresponding end of each of said delay lines being electrically interconnected and each of said delay lines having a transducer located at a first reference point thereon for activating a pair of travelling elastic wave signals along said firt pair of parallel delay lines;

said at least one second delay line element comprises a second pair of parallel delay lines forming a second pair of parallel paths at said preselected angle with respect to said first pair of parallel paths, a corresponding end of each of said delay lines being electrically interconnected and each delay line having a transducer located at a second reference point thereon for activating a pair of travelling elastic wave signals along said second pair of parallel delay lines;

each of said pairs of delay lines being capable of detecting the presence of elastic wave signals travelling along the other of said pairs of delay lines; and means responsive to said detected waves for determining said position in said preselected plane.

12. An apparatus in accordance with claim 11 wherein said elastic wave signals are continuous wave signals and further including means for substantially reducing reflections of said travelling continuous elastic wave signals in said delay lines.

13. An apparatus in accordance with claim 11 wherein said preselected angle is a right angle.

14. An apparatus in accordance with claim 7 wherein said at least one first delay line element comprises a first delay line forming a first curved path in a first plane;

said at least one second delay line element comprises a second delay line forming a second curved path in a second plane having a preselected angular relationship with said first curved path;

a first reference point having a preselected spatial relationship with said first and second curved paths;

a first transducer located at a second reference point on said first curved path for establishing first reference line between said first and second reference points in said first plane;

a second transducer located at a third reference point on said second curved path for establishing a second reference line between said first and third reference points in said second plane;

each of said delay lines being capable of detecting the presence of elastic wave signals travelling along the other of said delay lines; and means responsive to said detected wave signals for determining angular positions in said first and second planes relative to said first and second reference lines therein.

15. An apparatus in accordance with claim 14 wherein said elastic wave signals are continuous waves and further including means for substantially reducing reflections of said travelling continuous elastic wave signals in said delay lines.

16. An apparatus in accordance with claim 14 wherein said preselected angular relationship is a right angle.

17. An apparatus in accordance with claim 14 and further including at least one third delay line element capable of supporting a third travelling elastic wave signal in a direction along a third specified path and comprising a third delay line forming a third curved path in a third plane having preselected angular relationships with respect to each of the other of said curved paths;

said first reference point having a preselected spatial relationship with each of said first, second and third curved paths;

a third transducer located at a fourth reference point on said third curved path for establishing a third reference line between said first and fourth reference points in said third plane;

each of said delay lines being capable of detecting the presence of elastic wave signals travelling along each of the other of said delay lines; and means responsive to said detected wave signals for determining angular positions in each of said planes relative to the reference lines in said planes.

18. An apparatus in accordance with claim 17 wherein said elastic wave signals are continuous wave signals and further including means for substantially reducing reflections of said travelling continuous elastic wave signals in said delay lines.

19. An apparatus for determining a position on a curved surface comprising three mutually orthogonal delay lines each being capable of establishing electromagnetic fields associated with travelling elastic wave signals and forming three mutually orthogonal and specified curved paths on said curved surface;

each of said delay lines having a transducer located at a reference point on the curved path formed by each of said delay lines for activating a travelling elastic wave signal on each of said delay lines;

a fourth delay line forming a curved path having an angular relationship with each of the three mutually orthogonal curved paths formed by said three mutually orthogonal delay lines, said fourth delay line being capable of detecting the presence of a travelling elastic wave signal on each of said delay lines; and means responsive to said detected waves for measuring the angular relationships between said fourth delay line and each of said three mutually orthogonal delay lines whereby said position on said curved surface is determined.

20. An apparatus in accordance with claim 19 wherein said elastic wave signals are continuous wave signals and further including means for substantially reducing reflections of said travelling continuous elastic wave signals in said delay lines.

21. A position determining apparatus comprising a delay element capable of supporting a travelling continuous elastic wave signal;

a first transducer coupled to said delay element at a first region thereof for activating a first continuous elastic wave signal having a specified wavelength, $\lambda$, along said delay element;

a second transducer coupled to said delay element at a second region thereof at a distance from said first transducer equal to $(\lambda/4 + N2\pi)$, where $N$ is 0 or an integer, for activating a second continuous elastic wave signal having said specified wavelength, $\lambda$, along said delay element;

receiver transducer means coupled to said delay element at said second region corresponding to said position to be determined for detecting the presence of said continuous elastic wave signals as they travel past said position;

means responsive to said detected signals to obtain amplitude modulated sine and cosine signals for determining said position; and means for substantially reducing reflections of said travelling continuous elastic wave signals in said delay element.

22. A position determining apparatus comprising a delay element capable of supporting a travelling continous elastic wave signal;

a tranducer coupled to said delay element at a first region thereof for activating a continuous elastic wave signal having a specified wavelength, $\lambda$, along said delay element;

a first receiver transducer coupled to said delay element at a first position;

a second receiver transducer coupled to said delay element at a second position at a distance from said first receiver transducer equal to $(\lambda/4 + N2\pi)$ where $N$ is zero or an integer, each of said receiver tranducers detecting the presence of said travelling elastic wave signal as it travels past said first and second positions;

means responsive to said detected signals to obtain amplitude modulated sine and cosine signals for determining said position; and means for substantially reducing reflections of said travelling continuous elastic wave signals in said continuous elastic wave signals in said delay element.

23. Apparatus for determining an angular position with respect to a vertical reference comprising a cylinder having an inner surface;

a pendulum having a curved outer surface, said pendulum mounted so as to maintain a fixed position relative to said vertical reference, said curved outer surface corresponding to the inner surface of said cylinder and said cylinder and pendulum being capable of relative rotation with respect to each other;

a magnetically coupled delay line element on said curved outer surface of said pendulum to form a curved path thereon;

a transducer located at a reference point on said delay line for activating a traveling acoustic signal along said delay line;

a receiving transducer located on the inner surface of said cylinder for detecting the presence of said travelling acoustic signal on said delay line; and means responsive to said detected travelling acoustic signal for determining the angular position of said cylinder relative to said vertical reference.

24. An apparatus in accordance with claim 23 wherein said elastic wave signal is a continuous wave signal and further including means for substantially reducing reflections of said travelling continuous elastic wave signals in said delay line.

25. A position determining apparatus comprising at least one nonfluid delay element having magnetic properties and capable of establishing electromagnetic fields associated with omnidirectional travelling elastic wave signals in the delay element;

at least one transducer means electromagnetically coupled to said delay element at at least one reference position;

means for activating said at least one transducer means to produce electromagnetic fields associated with at least one elastic wave signal which travels in said delay element omnidirectionally from said at least one reference position;

at least one other transducer means coupled to said delay element at said position to be determined relative to said reference position, said at least one other transducer means detecting the presence of said travelling elastic wave signal as it travels past said position;

means responsive to said detected signal and to said activated signal for determining the position of said at least one other transducer relative to said reference position.

26. An apparatus in accordance with claim 25 wherein said elastic wave signal is a continuous wave signal and further including means for substantially reducing reflections of said travelling continuous elastic wave signal in said delay element.

27. A position determining apparatus comprising a delay element having magnetic properties and a planar surface and being capable of establishing electromagnetic fields associated with an omnidirectional travelling elastic wave signal;

at least one transducer means comprising at least two tranducers coupled to and located at known positions on said planar surface with respect to each other;

means for establishing electromagnetic fields by activating at least two omnidirectional elastic wave signals in said planar surface travelling from said known positions;

at least one other transducer means comprising a receiver transducer electromagnetically coupled to and located at a position to be determined relative to said known positions and responsive to said at least two elastic wave signals for detecting the presence of said electromagnetic signals as they travel past said position to be determined; and means responsive to said electromagnetic fields associated with activated elastic wave signals and said detected electromagnetic signals for determining said position.

28. An apparatus in accordance with claim 27 wherein said elastic wave signals are continuous wave signals and further including means for substantially reducing reflections of said travelling continuous elastic wave signals in said delay element.

29. An apparatus in accordance with claim 25 wherein
said nonfluid delay element is a curved surface.

30. An apparatus in accordance with claim 25 wherein said nonfluid delay element is a first solid spherical surface; said at least one transducer means comprises at least two transducer means located at known positions on said spherical surface with respect to each other for activating at least two omnidirectional elastic wave signals in said spherical surface travelling from said known positions;

said at least one other transducer means comprises a receiver transducer electromagnetically coupled and located on a second spherical surface concentric with said first spherical surface at a position to be determined relative to the known positions of said at least two transducer means and responsive to said at least two signals for detecting the presence of said signals as they travel past said position to be determined; and means responsive to said activated elastic wave signals and said detected electromagnetic fields associated with elastic wave signals for determining said position.

31. An apparatus in accordance with claim 30 wherein said at least two tranducers means comprises three transducer means located at three known positions relative to each other.

32. An apparatus in accordance with claim 30 wherein said elastic wave signals are continuous wave signals and further including means for substantially reducing reflections of said travelling continuous elastic wave signals in said spherical surfaces.

33. A position determining apparatus comprising a delay element capable of supporting a travelling elastic wave signal and mounted on a first member;

an input transducer coupled to said delay element for activating a continuous elastic wave signal which travels along said delay element;

an output transducer comprising a plurality of receiver transducer elements coupled to each other and to said delay element for detecting the presence of said travelling elastic wave signal on said delay element, said transducer elements being spaced by distances equal to multiples of half wavelength of said travelling continuous elastic wave signal over at least a region of said delay element, and said receiver transducer elements being mounted on a second member adjacent said first member;

means responsive to said detected continuous elastic wave signals for determining the position of said receiver transducer elements relative to a reference region on said delay element; and means for substantially reducing reflections of said travelling continuous elastic wave signals in said delay element;

said first and second members being relatively movable with respect to each other.

34. An apparatus in accordance with claim 33 wherein
said first member is a first cylinder and said delay element has magnetic properties and is capable of establishing electromagnetic fields associated with travelling waves, said delay element being mounted around the outer peripheral surface of said first cylinder;

said second member is a second cylinder concentrically mounted with respect to said first cylinder and said receiver transducer elements are electromagnetically coupled to said delay element and are in the form of a periodic wave pattern, said receiver transducer elements being mounted on the inner peripheral surface of said second cylinder so that said delay element and said receiver transducer elements are substantially coplanar.

35. An apparatus in accordance with claim 34 wherein said periodic wave pattern receiver transducer has a square wave pattern having a period equal to odd integral multiples of the wavelength of said travelling continuous elastic wave signal.

36. An apparatus in accordance with claim 33 wherein said first member has a first flat surface and said delay element is mounted on said first flat surface; said second member has a second flat surface and said receiver transducer element is mounted on said second flat surface, said second flat surface being oppositely disposed with respect to said first flat surface.

37. A position determining apparatus comprising two solid shell delay elements each forming a spherical section and combined to form an outer member;

an inner member enclosed within said outer member;

at least one electromagnetically coupled transducer means comprising at least six transducers electromagnetically coupled to and located on the surface of said inner member at known positions thereon;

means for activating at least six transducer elements for producing at least one travelling electromagnetic wave signal in the surface of a first one of said two shell elements;

at least one transducer means comprising at least three transducer elements coupled to and located at preselected positions on the surface of said first one of said two shell elements and responsive to said at least one electromagnetic wave signal for detecting the presence of said signal as it travels past said preselected positions; and means responsive to said activated elastic wave signal and to the detected electromagnetic signal at each of said at least three transducer elements for determining the position of said inner member relative to said outer member.

38. A position determining apparatus comprising two solid shell delay elements each forming a spherical section and combined to form an outer member;

a least one transducer means comprising at least three transducer elements coupled to and located at known positions on a first one of said two shell elements;

means for activating at least three omnidirectional elastic wave signals in the surface of said first one of said shell elements travelling from said known positions;

an inner member enclosed within said outer member;

at least one electromagnetically coupled transducer means comprising at least six transducers electromagnetically coupled to and located on the surface of said inner member at preselected positions thereon and responsive to said at least three electromagnetic wave signals for detecting the presence of said signals as they travel past said preselected positions; and means responsive to said activated elastic wave signals and to said detected electromagnetic signals for determining the position of said inner member relative to said outer member.

39. An apparatus in accordance with claim 38 wherein said pair of shell elements are each substantially hemispherical so as to form when combined a first spherical surface and wherein said preselected positions are such that said at least six transducers are arranged at the ends of three mutually orthogonal axes passing through the center of the sphere formed by said first spherical surface.

40. An apparatus in accordance with claim 39 wherein said inner member is a second spherical surface.

41. A position determining apparatus comprising two solid shell delay elements each forming a spherical section and combined to form an outer member;

at least one transducer means comprising at least three transducer elements coupled to and located at known positions on a first surface of a first one of said two shell elements and at least three transducers coupled to and located at known positions on a second surface of a second one of said two shell elements;

means for activating at least six elastic wave signals in said first and second surfaces travelling from said known positions;

an inner member enclosed within said outer member;

at least one electromagnetically coupled transducer means comprising at least three other transducers electromagnetically coupled to and located on the surface of said inner member at preselected positions thereof and responsive to said at least three electromagnetic signals for detecting the presence of said signals as they travel past said preselected positions; and means responsive to said activated elastic wave signals and to said detected electromagnetic signals for determining the position of said inner member relative to said outer member.

42. An apparatus in accordance with claim 41 wherein said two solid shell elements are each substantially hemispherical so as to form when combined a first spherical surface and wherein said preselected positions are such that said three other transducers are arranged not to lie in a common plane which passes through a great circle of the sphere formed by said first spherical surface.

43. An apparatus in accordance with claim 42 wherein said inner member is a second spherical surface.

44. A position determining apparatus comprising two solid shell delay elements each forming a spherical section and combined to form an outer member;

an inner member enclosed within said outer member;

at least one electromagnetically coupled transducer means comprising at least three transducer elements electromagnetically coupled to and located on the surface of said inner member at known positions thereof;

means for activating said at least three transducer elements for producing at least one electromagnetic signal in the surface of at least one of said two solid shell delay elements;

at least one transducer means comprising at least three transducer elements coupled to and located at preselected positions on a first surface of a first one of said two shell elements and at least three transducer elements coupled to and located at preselected positions on a second surface of a second one of said two shell elements, the at least three transducer elements of said at least one of said two solid shell elements being responsive to said at least one electromagnetic wave signal for detecting the presence of said signal as it travels past said preselected positions thereof; and means responsive to said detected elastic wave signals and to said detected electromagnetic signal at each of said at least three transducer elements for determining the position of said inner member relative to said outer member.

45. A position determining apparatus comprising a delay element capable of supporting a travelling elastic wave signal and mounted on a first member;

an input transducer comprising a plurality of transducer elements coupled to each other and to said delay element for activating a continuous elastic wave signal which travels along said delay element;

said transducer elements being spaced by distances equal to multiples of half wavelength of said travelling continuous elastic wave signal over at least a region of said delay element and being mounted on a second member adjacent said first member;

an output transducer coupled to said delay element for detecting the presence of said travelling elastic wave signal on said delay element;

means responsive to said detected continuous elastic wave signal for determining the position of said output transducer relative to a reference region of said delay element; and means for substantially reducing reflections of said travelling continuous elastic wave signal in said delay element;

said first and second members being relatively movable with respect to each other.

* * * * *